(12) United States Patent
Chai

(10) Patent No.: US 11,463,590 B2
(45) Date of Patent: Oct. 4, 2022

(54) CHARGING METHOD AND APPARATUS UTILIZING A CONTROL PLAN FUNCTION FOR A 5G SYSTEM

(71) Applicant: HUAWEI TECHNOLOGIES CO., LTD., Guangdong (CN)

(72) Inventor: Xiaoqian Chai, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/486,937

(22) Filed: Sep. 28, 2021

(65) Prior Publication Data

US 2022/0014632 A1    Jan. 13, 2022

Related U.S. Application Data

(63) Continuation of application No. PCT/CN2020/078315, filed on Mar. 7, 2020.

(30) Foreign Application Priority Data

Mar. 29, 2019 (CN) .......................... 201910252080.2

(51) Int. Cl.
*H04M 15/00* (2006.01)
*H04W 4/24* (2018.01)

(52) U.S. Cl.
CPC ....... *H04M 15/8038* (2013.01); *H04M 15/64* (2013.01); *H04M 15/65* (2013.01); *H04M 15/8228* (2013.01); *H04W 4/24* (2013.01)

(58) Field of Classification Search
CPC .. H04M 15/8038; H04M 15/64; H04M 15/65; H04M 15/8228; H04W 4/24
See application file for complete search history.

(56) References Cited

U.S. PATENT DOCUMENTS

2019/0215403 A1*   7/2019   Chai ................... H04L 12/1407
2020/0245209 A1*   7/2020   Patil ..................... H04W 76/12
(Continued)

FOREIGN PATENT DOCUMENTS

CN         1946121 A      4/2007
CN       107547212 A      1/2018
(Continued)

OTHER PUBLICATIONS

3GPP TS 32.255 V1.2.0 (Aug. 2018);3rd Generation Partnership Project;Technical Specification Group Services and System Aspects;Telecommunication management;Charging management;5G Data connectivity domain charging; stage 2(Release 15),total 72 pages.
(Continued)

*Primary Examiner* — Pakee Fang

(57) ABSTRACT

Embodiments of this application provide a charging session method and an apparatus. A control plane function entity determines to request a charging function (CHF) entity to establish a service-based interface (SBI) charging session for a 4G data connection. The control plane function entity requests, through the SBI charging session, to perform online charging and/or offline charging in the 4G data connection. According to the method, the SBI charging session that is requested by the control plane function entity to establish for the 4G data connection may support performing the online charging in the 4G data connection, and support performing the offline charging in the 4G data connection. Therefore, the disclosed embodiments simplify a procedure of charging online data and offline data in the 4G data connection by using different charging sessions.

20 Claims, 12 Drawing Sheets

(56) References Cited

U.S. PATENT DOCUMENTS

| | | | | |
|---|---|---|---|---|
| 2020/0358909 | A1* | 11/2020 | Ahmadi | H04L 65/1016 |
| 2021/0218849 | A1* | 7/2021 | Cai | H04L 12/1407 |

FOREIGN PATENT DOCUMENTS

| | | |
|---|---|---|
| CN | 108401231 A | 8/2018 |
| CN | 109257788 A | 1/2019 |
| CN | 109391475 A | 2/2019 |
| WO | 2017054611 A1 | 4/2017 |
| WO | 2018127108 A1 | 7/2018 |
| WO | 2019011794 A1 | 1/2019 |
| WO | 2019035836 A1 | 2/2019 |

OTHER PUBLICATIONS

3GPP TS 32.290 V15.2.0 (Dec. 2018)3rd Generation Partnership Project;Technical Specification Group Services and System Aspects; Telecommunication management; Charging management; 5G system; Services, operations and procedures of charging using Service Based Interface (SBI) (Release 15),Total 25 Pages.

3GPP TS 23.501 V16.0.0 (Mar. 2019), 3rd Generation Partnership Project; Technical Specification Group Services and System Aspects; System Architecture for the 5G System; Stage 2(Release 16), 318 pages.

3GPP TR 32.899 V1.0.0 (Sep. 2017);3rd Generation Partnership Project;Technical Specification Group Services and System Aspects;Telecommunication management;Charging management;Study on charging aspects of 5G system architecture Phase 1 (Release 15),total 60 pages.

3GPP TS 23.502 V16.0.0 (Mar. 2019), 3rd Generation Partnership Project; Technical Specification Group Services and System Aspects; Procedures for the 5G System; Stage 2(Release 16), 420 pages.

Huawei,"Discussion on 5G offline charging service",3GPP TSG-SA5 Meeting #123 S5-191334,Montreal, Canada, Jan. 21-25, 2019,total 3 pages.

3GPP TS 32.255 V15.1.0 (Dec. 2018);3rd Generation Partnership Project;Technical Specification Group Services and System Aspects;Telecommunication management;Charging management;5G data connectivity domain charging; stage 2(Release 15),total 67 pages.

Nokia et al.,"pCR TS 32.255 Introduce Interworking with EPC",3GPP TSG-SAS Meeting #119 S5-183383,La Jolla,US, May 14-18, 2018,total 6 pages.

3GPP TS 32.255 V2.0.0 (Sep. 2018),3rd Generation Partnership Project Technical Specification Group Services and System Aspects;Telecommunication management;Charging management;5G Data connectivity domain charging;stage 2(Release 15),total 72 pages.

Nokia et al.,"pCR TS 32.255 Introduce Interworking with EPC",3GPP TSG-SA5 Meeting #119 S5-183272,La Jolla, US, May 14-18, 2018,Total 6 Pages.

Vodafone,"High level overall charging architecture",3GPP TSG-SA5 Meeting #120 S5-185473,Belgrade, Serbia, Aug. 20-24, 2018,Total 3 Pages.

* cited by examiner

| 5G charging trigger | 4G charging trigger |
|---|---|
| SERVING_NODE_CHANGE | CHANGE_IN_SERVING_NODE |
| A | A' |
| B | B' |
| C | C' |

CHARGING METHOD AND APPARATUS UTILIZING A CONTROL PLAN FUNCTION FOR A 5G SYSTEM

This application is a continuation of International Patent Application No. PCT/CN2020/078315 filed on Mar. 7, 2020, which claims priority to Chinese Patent Application No. 201910252080.2 filed on Mar. 29, 2019. The disclosures of the aforementioned applications are hereby incorporated by reference in their entireties.

TECHNICAL FIELD

This application relates to the field of communications technologies, and in particular, to a charging method and an apparatus.

BACKGROUND

As wireless communications technologies are rapidly developed, a fifth generation (Fifth Generation, 5G) mobile communications technology emerges. At an early stage of network deployment, when a location of the terminal changes, a terminal may be handed over between a 5G network and a fourth generation (Fourth Generation, 4G) network due to limited coverage of the 5G network.

Handover between the 5G system and an evolved packet system (evolved packet system, EPS) may be performed between a mobility management entity (Mobility Management Entity, MME) and an access and mobility management function (Access and Mobility Management Function, AMF) entity through an N26 interface. The 5G system may be referred to as a 5GS, and the evolved packet system (evolved packet system, EPS) may be referred to as a 4GS.

A current 4G charging system includes an online charging system and an offline charging system. Online charging and offline charging are controlled by two sets of interfaces, and an online charging session and an offline charging session are separated. Therefore, when an operator deploys both a 4G system and the 5G system, there are different charging interfaces, protocols, and charging systems. As a result, it is complex to deploy the charging systems in an existing architecture.

SUMMARY

Embodiments of this application provide a charging method and apparatus, so that a charging session established for a terminal can adapt to different charging manners and charging systems, thereby simplifying charging system deployment.

To achieve the foregoing objective, the embodiments of this application provide the following technical solutions.

According to a first aspect, a charging method for network system handover is provided. The method includes: A control plane function entity determines to request a charging function entity to establish a service-based interface SBI charging session for a 4G data connection. The control plane function entity requests, through the SBI charging session, to perform online charging and/or offline charging in the 4G data connection. According to the method, the SBI charging session that is established by the control plane function entity for the 4G data connection may support performing the online charging in the 4G data connection, and support performing the offline charging in the 4G data connection. Therefore, this simplifies a procedure of charging online data and offline data in the 4G data connection by using different charging sessions.

In a possible implementation, the control plane function entity includes a packet data network gateway control plane function. That a control plane function entity determines to request the charging function entity to establish an SBI charging session includes any one of the following: The control plane function entity determines that the control plane function entity further includes a session management function. The control plane function entity determines that a policy and charging control rule PCC rule includes indication of requesting the charging function entity to establish the SBI charging session or includes: an address of a charging system designated for the 4G data connection is an address of the charging function entity using an SBI. The control plane function entity determines that a previous charging session for the 4G data connection is an SBI charging session established with the charging function entity. Alternatively, the control plane function entity determines to communicate with a policy function entity through an SBI message. The foregoing optional methods can avoid establishing SBI charging sessions for all 4G data connections, and ensure success of establishing the SBI charging session.

In a possible implementation, the control plane function entity includes a packet data network gateway control plane function. That a control plane function entity determines to request a charging function entity to establish an SBI charging session for 4G data connection includes: The control plane function entity determines that the control plane function entity determines further includes a session management function. The control plane function entity determines that a terminal needs to support handover from a 4G network to a 5G network. The foregoing optional methods can avoid establishing SBI charging sessions for all 4G data connections, and ensure success of establishing the SBI charging session.

In a possible implementation, the control plane function entity receives a request for establishing the 4G data connection. That the control plane function entity determines that the terminal needs to support handover from a 4G network to a 5G network includes: The control plane function entity determines, based on a 5G system interworking indication parameter in the request for establishing the 4G data connection, that the terminal supports gaining access to the 5G network and/or to allow the 4G data connection to interwork with the 5G network. The foregoing optional methods can avoid establishing SBI charging sessions for all 4G data connections, and ensure success of establishing the SBI charging session.

In a possible implementation, the control plane function entity further receives a request for establishing the 4G data connection. The control plane function entity includes a packet data network gateway control plane function. That a control plane function entity determines to request the charging function entity to establish an SBI charging session includes: The control plane function entity determines that the control plane function entity further includes a session management function. The control plane function entity determines, based on a 5G system interworking indication parameter in the request for establishing the 4G data connection, that a terminal supports gaining access to a 5G network and/or to allow the 4G data connection to interwork with the 5G network. The foregoing optional methods can avoid establishing SBI charging sessions for all 4G data connections, and ensure success of establishing the SBI charging session.

In a possible implementation, during handover from the 4G data connection to a 5G data connection, the method further includes:

The control plane function entity determines that a 4G handover trigger is in an active state, and that a type of the 4G handover trigger is an immediate reporting trigger. The control plane function entity sends a charging update message to the charging function entity through the SBI charging session. The charging update message includes network usage information of the 4G data connection and/or a quota request for the 5G data connection after the handover. According to the foregoing method, the control plane function entity may charge, by using the SBI charging session established for the 4G data connection in the 4G network, network usage of the 5G data connection after the handover. In this way, there is no need to re-establish a charging session for the 5G data connection after the handover, thereby simplifying a network handover procedure.

In a possible implementation, during handover from the 4G data connection to a 5G data connection, the control plane function entity determines that a 4G handover trigger is in an active state, and that a type of the 4G handover trigger is a deferred reporting trigger. The control plane function entity stops recording network usage information of the 4G data connection, and re-records network usage information of the 5G data connection after the handover. According to the foregoing method, after the handover, network usage of the 4G data connection and network usage of the 5G data connection are processed based on a status and the type of the trigger, so that charging is more accurate.

In a possible implementation, the control plane function entity uses a quota obtained for the 4G data connection for the 5G data connection in the 5G network. According to the foregoing method, after the handover, network usage of the 4G data connection and network usage of the 5G data connection are processed based on information of the trigger, so that charging is more accurate.

In a possible implementation, the control plane function entity stores an available 4G quota for the 4G data connection. The control plane function entity uses the 4G quota for the 5G data connection. According to the foregoing method, after the handover, network usage of the 4G data connection and network usage of the 5G data connection are processed based on information of the trigger, so that charging is more accurate.

In a possible implementation, the control plane function entity processes an activated 4G charging trigger event trigger for the 4G data connection. According to the foregoing method, after the handover, usage of the 4G network and usage of the 5G network are processed based on information of the trigger, so that charging is more accurate.

In a possible implementation, the control plane function entity determines that the activated 4G charging trigger for the 4G data connection is not support in the 5G data connection after the handover, and the control plane function entity ignores, in the 5G data connection after the handover, the 4G charging trigger. The control plane function entity determines that the 5G data connection after the handover supports the activated 4G charging trigger for the 4G data connection, and the control plane function entity uses, in the 5G data connection after the handover, the 4G charging trigger. Alternatively, the control plane function entity maps the activated 4G charging trigger for the 4G data connection to a 5G charging trigger for the 5G network, and uses the mapped 5G charging trigger for the 5G data connection after the handover. According to the foregoing method, the 4G charging trigger is processed after the handover, so that charging is more accurate.

According to a second aspect, a charging method for network system handover is provided. The method includes: A control plane function entity sends a charging service establishment message for a 5G data connection to a charging function entity through a service-based interface SBI. The service establishment request message is used to request to establish an SBI charging session for the 5G data connection. The control plane function entity requests, through the SBI charging session, to perform online charging and/or offline charging in the 5G data connection. After handover from the 5G data connection to a 4G data connection, the control plane function entity requests, through the SBI charging session, to perform online charging and/or offline charging in the 4G data connection. According to the foregoing method, the control plane function entity may charge, by using the SBI charging session established for the 5G data connection, network usage of the 4G data connection after the handover. In this way, there is no need to re-establish a charging session for the 4G data connection after the handover, thereby simplifying a network handover procedure.

In a possible implementation, during the handover from the 5G data connection to the 4G data connection, the control plane function entity determines that a 5G handover trigger is in an active state, and that a type of the 5G handover trigger is an immediate reporting trigger. The control plane function entity sends a charging update message to the charging function entity through the SBI charging session. The charging update message includes network usage information of the 5G data connection and/or a quota request for the 4G data connection after the handover. According to the foregoing method, the 5G charging trigger is processed after the handover, so that charging is more accurate.

In a possible implementation, during the handover from the 5G data connection to the 4G data connection, the control plane function entity determines that a 5G handover trigger is in an active state, and that a type of the 5G handover trigger is a deferred reporting trigger. The control plane function entity stops recording network usage information of the 5G data connection, and re-records network usage information of the 4G data connection after the handover. According to the foregoing method, the 5G charging trigger is processed after the handover, so that charging is more accurate.

In a possible implementation, the control plane function entity uses a quota obtained for the 5G data connection for the 4G data connection in 4G network. According to the foregoing method, after the handover, the quota in the 5G network is used, and there is no need to apply for a quota for the 4G data connection. Therefore, a service is processed more smoothly.

In a possible implementation, during the handover from the 5G data connection to the 4G data connection, the control plane function entity determines that there is no active 5G handover trigger. The control plane function entity records network usage information of the 5G data connection and network usage information of the 4G data connection. According to the foregoing method, the 5G charging trigger is processed after the handover, so that charging is more accurate.

In a possible implementation, the control plane function entity processes an activated 5G charging trigger for the 5G data connection. According to the foregoing method, the 5G charging trigger is processed after the handover, so that charging is more accurate.

In a possible implementation, the control plane function entity determines that the activated 5G charging trigger for the 5G data connection is not supported in the 4G data connection after the handover, and ignores, in the 4G data connection after the handover, the 5G charging trigger. The control plane function entity determines that the 4G data connection after the handover supports the activated 5G charging trigger for the 5G data connection, and uses the 5G charging trigger for the 4G data connection after the handover. The control plane function entity maps the activated 5G charging trigger for the 5G data connection to a 4G charging trigger for the 4G network, and uses the mapped 4G charging trigger for the 4G data connection after the handover. According to the foregoing method, the 5G charging trigger is processed after the handover, so that charging is more accurate.

In a possible implementation, after a network handover request for the 5G data connection is received, the control plane function entity determines that the control plane function entity does not support passing an online charging data flow in a 4G network before obtaining a quota granted by the charging function entity. The control plane function entity passes the online charging data flow after receiving the quota granted by the charging function entity. According to the foregoing method, the 5G charging trigger is processed after the handover, so that charging is more accurate.

According to a third aspect, a charging method for network system handover is provided. For a first network data connection, a control plane function entity sends a charging service establishment message to a charging function entity, to request to establish a charging session for the first network data connection. The charging function entity performs online charging and/or offline charging in the first network data connection by using the charging session. After handover from the first network data connection to a second network data connection, the control plane function entity requests, through the charging session, to perform online charging and/or offline charging in the second network data connection established for the terminal. According to the foregoing method, after the handover from the first network data connection to the second network data connection, the control plane function entity charges, by using the charging session established for the first network data connection before the handover, network usage of the second network data connection. Therefore, there is no need to re-establish a charging session after the terminal is handed over to the second network, thereby simplifying a handover procedure.

In a possible implementation, the first network is a 4G network, and the second network is a 5G network. The control plane function entity may perform processing performed by the control plane function entity in all possible implementations of the first aspect.

In a possible implementation, the first network is a 5G network, and the second network is a 4G network. The control plane function entity may perform processing performed by the control plane function entity in all possible implementations of the first aspect.

According to a fourth aspect, a charging method is provided. A control plane function entity determines to request a charging function entity to establish a service-based interface SBI charging session for a 4G data connection. The charging function entity performs online charging and/or offline charging in the 4G data connection by using the SBI charging session. According to the method, the SBI charging session that is established by the control plane function entity for the 4G data connection may support performing the online charging in the 4G data connection, and support performing the offline charging in the 4G data connection. Therefore, this simplifies a procedure of charging online data and offline data in the 4G data connection by using different charging sessions.

In a possible implementation, the control plane function entity may perform any processing performed by the control plane function entity in all possible implementations of the first aspect.

In a possible implementation, the charging function entity may perform all possible implementations of the first aspect, and/or perform processing performed by the charging function entity in the procedures corresponding to FIG. 3A, FIG. 3B, and FIG. 4A to FIG. 4D.

According to a fifth aspect, a charging method is provided. The method includes: A charging function entity receives a charging service establishment message sent by a control plane function entity through an SBI. The charging service establishment message sent through the SBI is used to request to establish for a 4G data connection, an SBI charging session that supports performing online charging and performing offline charging in the 4G data connection. The charging function entity performs the online charging and/or the offline charging in the 4G data connection. According to the method, the charging function entity establishes the SBI charging session for the 4G data connection, so that the SBI charging session can support performing the online charging in the 4G data connection, and support performing offline charging in the 4G data connection.

In a possible implementation, the charging function entity receives a charging session update message through the SBI charging session. The charging session update message carries an identifier of a 5G data connection after handover.

In a possible implementation, the charging session update message carries network usage information of the 4G data connection and/or a quota request for the 5G data connection in 5G network. The charging function entity performs the online charging and/or the offline charging in the network usage information of the 4G data connection based on the charging session update message. The charging function entity grants a quota to the 5G data connection in the 5G network.

In a possible implementation, the charging function entity specifies a 5G charging parameter for the 5G data connection.

According to a sixth aspect, a charging method for network handover is provided. The method includes: A charging function entity receives a charging service establishment message sent by a control plane function entity. The charging service establishment message is used to request to establish a charging session for a first network data connection. The charging function entity receives a charging session update message through the charging session. The charging session update message carries an identifier of a second network data connection and network usage information of the first network data connection. After the terminal is handed over from the accessed first network to a second network, the charging function entity charges the second network data connection by using the charging session. According to the foregoing method, the charging function entity may charge usage information of the second network data connection after the handover by using the charging session established for the first network data connection. Therefore, there is no need to re-establish a charging session after the terminal is handed over to the second network connection, thereby simplifying a handover and charging procedure.

In a possible implementation, the first network is a 4G network, and the second network is a 5G network. The charging function entity may perform all possible implementations of the first aspect, or perform processing performed by the charging function entity in FIG. 3A, FIG. 3C, and FIG. 4A to FIG. 4D.

In a possible implementation, the first network is a 5G network, and the second network is a 4G network. The charging function entity may perform all possible implementations of the first aspect, or perform processing performed by the charging function entity in FIG. 3B, and FIG. 5A and FIG. 5B.

According to a seventh aspect, a charging method for network handover is provided. The method includes: For a first network data connection, the control plane function entity sends a charging service establishment message to a charging function entity, to request to establish a charging session for the first network data connection. The charging fucntion entity performs online charging and/or offline charging in the first network data connection in the charging session. After handover from the first network data connection to a second network data connection, the charging function entity performs online charging and/or offline charging in the second network data connection by using the charging session. According to the foregoing method, the control plane function entity and the charging function entity may charge, by using the charging session established for the first data connection, network usage of a terminal in the second network data connection after the handover. Therefore, there is no need to re-establish a charging session after the terminal is handed over to the second network connection, thereby simplifying a handover and charging procedure.

In a possible implementation, the first network is a 4G network, and the second network is a 5G network. The charging function entity may perform all possible implementations of the first aspect, or perform processing performed by the charging function entity in FIG. 3A, FIG. 3C, and FIG. 4A to FIG. 4D. The control plane function entity may perform all possible implementations of the first aspect, or perform processing performed by the control plane function entity in FIG. 3A, FIG. 3C, and FIG. 4A to FIG. 4D.

In a possible implementation, the first network is a 5G network, and the second network is a 4G network. The charging function entity may perform all possible implementations of the second aspect, or perform processing performed by the charging function entity in FIG. 3B, and FIG. 5A and FIG. 5B. The control plane function entity may perform all possible implementations of the second aspect, or perform processing performed by the control plane function entity in FIG. 3B, and FIG. 5A and FIG. 5B.

According to an eighth aspect, a charging method for network handover is provided. The method includes: The control plane function entity requests a charging function entity to establish a service-based interface SBI charging session for a 4G data connection. The charging function entity performs online charging and/or offline charging in the 4G data connection by using the SBI charging session. The foregoing optional methods can avoid establishing SBI charging sessions for all 4G data connections, and ensure success of establishing the SBI charging session.

According to a ninth aspect, an apparatus is provided. The apparatus has functions of implementing the control plane function entity in the method according to the first aspect, the second aspect, or the third aspect. The functions may be implemented by hardware, or may be implemented by hardware executing corresponding software. The hardware or the software includes one or more modules corresponding to the functions.

According to a tenth aspect, an apparatus is provided and includes a processor and a memory. The memory is configured to store a computer execution instruction. When the apparatus runs, the processor executes the computer execution instruction stored in the memory, so that the apparatus performs the method according to any one of the first aspect, the second aspect, or the third aspect. The apparatus may be specifically the control plane network function entity in the method according to any one of the first aspect, the second aspect, or the third aspect, or a chip in the control plane network function entity.

According to an eleventh aspect, a computer-readable storage medium is provided. The computer-readable storage medium stores an instruction. When the instruction is run on a computer, the computer is enabled to perform the charging method according to any one of the first aspect, the second aspect, or the third aspect.

According to a twelfth aspect, a computer program product including an instruction is provided. When the computer program product runs on a computer, the computer is enabled to perform the charging method for network system handover according to any one of the first aspect.

For technical effects brought by any design manner of the second to the sixth aspects, refer to technical effects brought by different design manners of the first aspect, and details are not described herein again.

According to a thirteenth aspect, an apparatus is provided. The apparatus has functions of implementing the method according to the fifth aspect and/or the sixth aspect. The functions may be implemented by hardware, or may be implemented by hardware executing corresponding software. The hardware or the software includes one or more modules corresponding to the functions.

According to a fourteenth aspect, an apparatus is provided and includes a processor and a memory. The memory is configured to store a computer execution instruction. When the apparatus runs, the processor executes the computer execution instruction stored in the memory, so that the apparatus performs the method according to either of the fifth aspect and/or the sixth aspect.

According to a fifteenth aspect, a computer-readable storage medium is provided. The computer-readable storage medium stores an instruction. When the instruction is run on a computer, the computer is enabled to perform the charging method according to either of the fifth aspect and/or the sixth aspect.

According to a sixteenth aspect, a computer program product including an instruction is provided. When the computer program product runs on a computer, the computer is enabled to perform the charging method according to either of the fifth aspect and/or the sixth aspect.

According to a seventeenth aspect, a system is provided and includes a control plane function entity and a charging function entity. The control plane function entity may perform processing performed by the control plane function entity in any one of the foregoing aspects. The charging function entity may perform processing performed by the charging function entity in any one of the foregoing aspects.

These aspects or other aspects of this application are clearer and more comprehensible in descriptions of the following embodiments.

DESCRIPTION OF EMBODIMENTS

Network interworking indicates that different networks can communicate with each other. In a network interworking scenario, terminal access can be handed over between different networks. The network interworking also indicates handover between different network data connections. Handover between different networks in the network interworking scenario may be: network handover performed by a terminal when a location of the terminal changes, handover of terminal access between the different networks due to a change of signal strength of the different networks, or network handover because a user actively chooses to gain access to a different network. Network handover may be handover between a 4G network and a 5G network. The 4G network may also be referred to as an evolved packet system (evolved packet system, EPS).

The network architecture and the service scenario described in the embodiments of the present disclosure are intended to describe the technical solutions in the embodiments of the present disclosure more clearly, and do not constitute a limitation on the technical solutions provided in the embodiments of the present disclosure. A person of ordinary skill in the art may know that: With the evolution of the network architecture and the emergence of new service scenarios, the technical solutions provided in the embodiments of the present disclosure are also applicable to similar technical problems.

Embodiments of the present disclosure provide a charging method and an apparatus, to perform charging in a 4G data connection, and perform charging in a scenario in which handover is performed between a first network and a second network. The first network may be a 4G network, and the second network may be a 5G network. In another optional manner, the first network may be a 5G network, and the second network is a 4G network.

Figure 1:
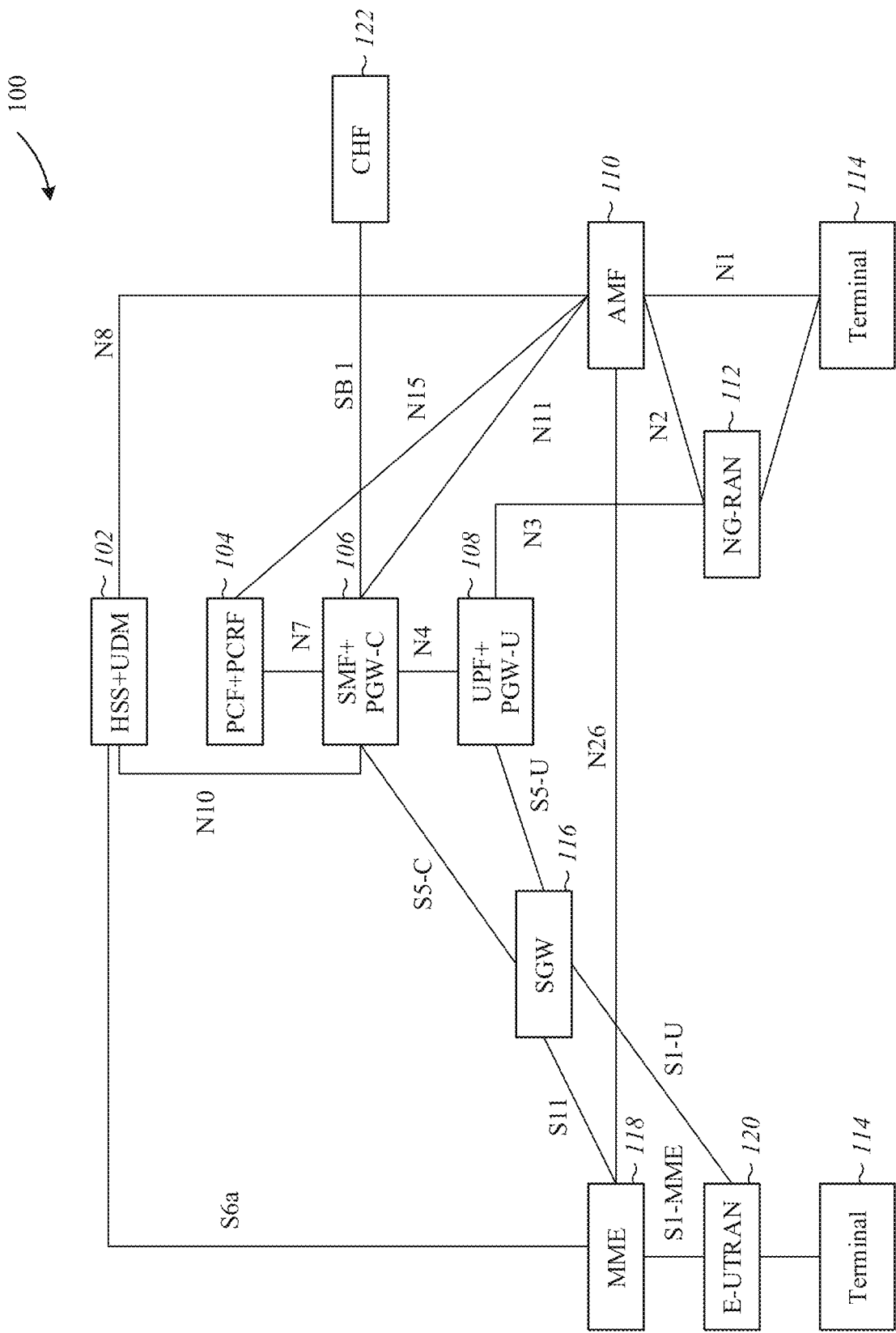
FIG. 1 is a schematic diagram of an interworking architecture of a first network and a second network.

Embodiments of the present disclosure provide a charging method and an apparatus, applicable to a system 100 in an interworking architecture shown in FIG. 1. It should be noted that the embodiments of the present disclosure are similarly applicable to interworking between another conventional network and a network based on a service-based architecture.

Alternatively, as shown in FIG. 1, the system 100 includes a user plane function entity 108, a control plane function entity 106, a policy control function entity 104, and a user subscription database 102 that are integrated in a 4G network and a 5G network. The integrated control plane function entity 106 includes a packet data network (packet data network, PDN) gateway control plane function (PDN gateway control plane function, PGW-C) in the 4G network and a session management function (session management function, SMF) in the 5G network. The integrated user plane function entity 108 includes a user plane function (user plane function, UPF) and a PDN gateway control plane function (PGW-U). The integrated policy control function entity 104 includes a policy control function (policy control function, PCF) and a policy and charging rules function (policy and charging rules function, PCRF). The integrated user subscription database 102 includes a home subscriber server (Home Subscriber Server, HSS) and unified data management (unified data management, UDM). The system 100 further includes an SBI-based charging function (Charging Function, CHF) entity 122 in the 5G network. The system 100 further includes a 4G online charging system (not shown in the figure) and a 4G offline charging system (not shown in the figure).

In the foregoing integrated entity, the UPF entity is a user plane function entity in the 5G network, and the PGW-U entity is a gateway user plane function in the 4G network. The SMF entity is a session management function entity in the 5G network, and the PGW-C entity is a control plane function entity of a data gateway in the 4G network. The PCF entity is a policy control function entity in the 5G network. The PCRF entity is a policy and charging rules function entity in the 4G network. "Integrated" herein indicates that a same device has functions of both a network entity in the 4G network and a corresponding entity in the 5G network. Therefore, an integrated entity may support the 4G network and the 5G network.

The integrated user plane function entity 108 may be referred to as a user plane function entity for short. The integrated control plane function entity 106 may be referred to as a control plane function entity for short. The integrated policy control function entity 104 may be referred to as a policy control function entity 106 for short. The integrated user subscription database 102 may be referred to as a user subscription database 102 for short. The foregoing network devices obtained after the integrated configuration may also use other names. This is not specifically limited in this embodiment of this application.

In addition, the system 100 shown in FIG. 1 may further include a mobility management entity (Mobility Management Entity, MME) 118 and a serving gateway (Serving Gateway, SGW) 116 in the 4G network, and an access and mobility management function (Access and Mobility Management Function, AMF) entity 110 in the 5G network.

A terminal 114 gains access to the 4G network by using an evolved universal terrestrial radio access network (evolved universal terrestrial radio access network, E-UTRAN) device 120, and the terminal 114 gains access to the 5G network by using a next generation radio access network (next generation radio access network, NG-RAN) device 112. The E-UTRAN device 120 communicates with the MME 118 through an S1-MME interface.

It should be noted that names of interfaces between network elements in FIG. 1 are only examples, and the interfaces may have other names during specific implementation. This is not specifically limited in this embodiment of this application.

Certainly, there may be another network element in the 4G network and the 5G network. For example, the 5G network may further include an authentication server function (authentication server function, AUSF) entity, a network slice selection function (network slice selection function, NSSF) entity, and the like, this is not specifically limited in this embodiment of this application.

A PDN connection or an IP connectivity access network (IP connectivity access network session, IP-CAN session) connection in the 4G network is supported by the PGW-C in the network element 106 integrated by the PGW-C and the SMF and the PGW-U in the network element 108 integrated by the PGW-U and the UPF. The PDN connection or the IP-CAN session may be referred to as a 4G data connection. After terminal access is handed over from the 4G network to the 5G network, a PDU session obtained after the handover is supported by the SMF in the control plane function entity 106 and the UPF in the integrated user plane function entity 108.

The terminal (terminal) 114 in this embodiment of this application includes a device that supports only to gain access to the 4G network, or may include a device that supports to gain access to both the 4G network and the 5G network. These devices may include various handheld devices, in-vehicle devices, wearable devices, or computing devices that have a wireless communication function, or other processing devices connected to a wireless modem, may further include a cellular phone (cellular phone), a smartphone (smart phone), a wireless data card, a personal digital assistant (personal digital assistant, PDA) computer, a tablet computer, a wireless modem (modem), a laptop computer (laptop computer), a machine type communication (machine type communication, MTC) terminal, user equipment (user equipment, UE), or the like. For ease of description, the foregoing devices are collectively referred to as a terminal in this application.

The following describes the technical solutions in the embodiments of this application with reference to the accompanying drawings in the embodiments of this application. In the descriptions of this application, unless otherwise specified, "a plurality of" means two or more than two. In addition, for convenience of clear description of the technical solutions in the embodiments of this application, in the embodiments of this application, terms such as "first" and "second" are used to distinguish between same objects or similar objects whose functions and purposes are basically the same. A person skilled in the art may understand that the terms, such as "first" and "second", are not intended to limit a quantity or an execution sequence; and the terms, such as "first" and "second", do not indicate a definite difference. "A and/or B" in the present disclosure may be explained as any one of A or B, or include A and B.

Figure 2:
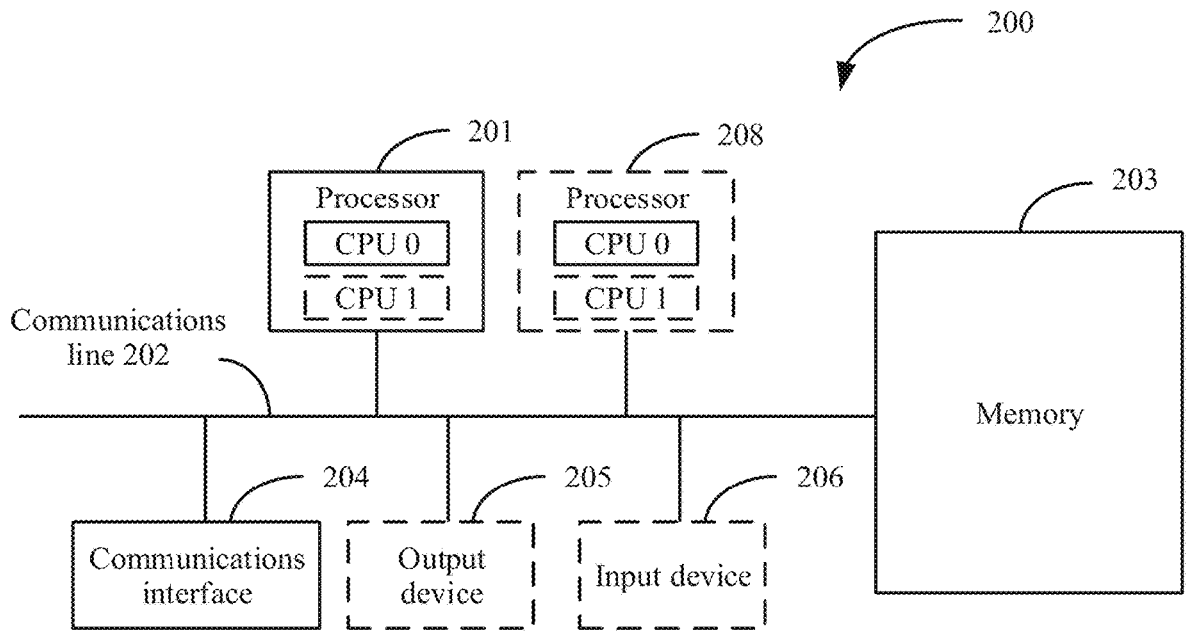
FIG. 2 is a schematic diagram of a hardware structure of a communications device according to an embodiment of this disclosure.

As shown in FIG. 2, the network element or the device shown in FIG. 1, for example, the terminal 114, the MME 118, the AMF 110, the control plane function entity 106, the policy control function entity 104, the user subscription database 102, the E-UTRAN 120, or the NG-RAN 112, may be implemented in a communications device (or system) in FIG. 2.

FIG. 2 is a schematic diagram of a hardware structure of the communications device according to an embodiment of this application. The communications device 200 includes at least one processor 201, a communications line 202, a memory 203, and at least one communications interface 204.

The processor 201 may be a general-purpose central processing unit (central processing unit, CPU), a microprocessor, an application-specific integrated circuit (application-specific integrated circuit, ASIC), or one or more integrated circuits that are configured to control execution of a program in a solution of this application.

The communications line 202 may include a path for transmitting information between the foregoing components.

The communications interface 204 uses any apparatus such as a transceiver, to communicate with another device or a communications network, for example, the Ethernet, a radio access network (radio access network, RAN), or wireless local area networks (wireless local area networks, WLAN).

The memory 203 may be a read-only memory (read-only memory, ROM) or another type of static storage device that can store static information and instructions, or random access memory (random access memory, RAM) or another type of dynamic storage device that can store information and instructions. The memory 203 may alternatively be an electrically erasable programmable read-only memory (electrically erasable programmable read-only memory, EEPROM) and a compact disc read-only memory (compact disc read-only memory, CD-ROM) or another compact disc storage, optical disc storage (including a compact disc, a laser disc, an optical disc, a digital versatile disc, a Blu-ray optical disc, and the like) and a magnetic disk storage medium or another magnetic storage device. The memory 203 may alternatively be any other medium that can be used to carry or store expected program code in a form of an instruction or a data structure and that can be accessed by a computer, but is not limited thereto. The memory may exist independently, and is connected to the processor through the communications line 202. The memory may alternatively be integrated with the processor.

The memory 203 is configured to store a computer execution instruction for executing the solutions of this application, and the processor 201 controls the execution. The processor 201 is configured to execute the computer execution instruction stored in the memory 203, to implement a session establishment method provided in the following embodiments of this application.

Optionally, the computer execution instructions in this embodiment of this application may also be referred to as application program code. This is not specifically limited in this embodiment of this application.

During specific implementation, in an embodiment, the processor 201 may include one or more CPUs.

During specific implementation, in an embodiment, the communications device 200 may include a plurality of processors, for example, the processor 201 and a processor 208 in FIG. 2. Each of the processors may be a single-core (single-CPU) processor or a multi-core (multi-CPU) processor. The processor herein may be one or more devices, circuits, and/or processing cores for processing data (for example, computer program instructions).

During specific implementation, in an embodiment, the communications device 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, a projector (projector), or the like. The input device 206 communicates with the processor 201, and may receive input from a user in a plurality of manners. For example, the input device 206 may be a mouse, a keyboard, a touchscreen device, or a sensing device.

The foregoing communications device 200 may be a general-purpose device or a dedicated device. During specific implementation, the communications device 200 may be a desktop computer, a portable computer, a network server, a single-chip microcomputer, a blade server, a palmtop computer (personal digital assistant, PDA), a mobile phone, a tablet computer, a wireless terminal device, an embedded device, any network entity, or a device having a structure similar to that in FIG. 2. A type of the communications device 200 is not limited in this embodiment of this application.

The following describes in detail a session establishment method provided in the embodiments of this application with reference to FIG. 1 to FIG. 2.

Figure 3A:
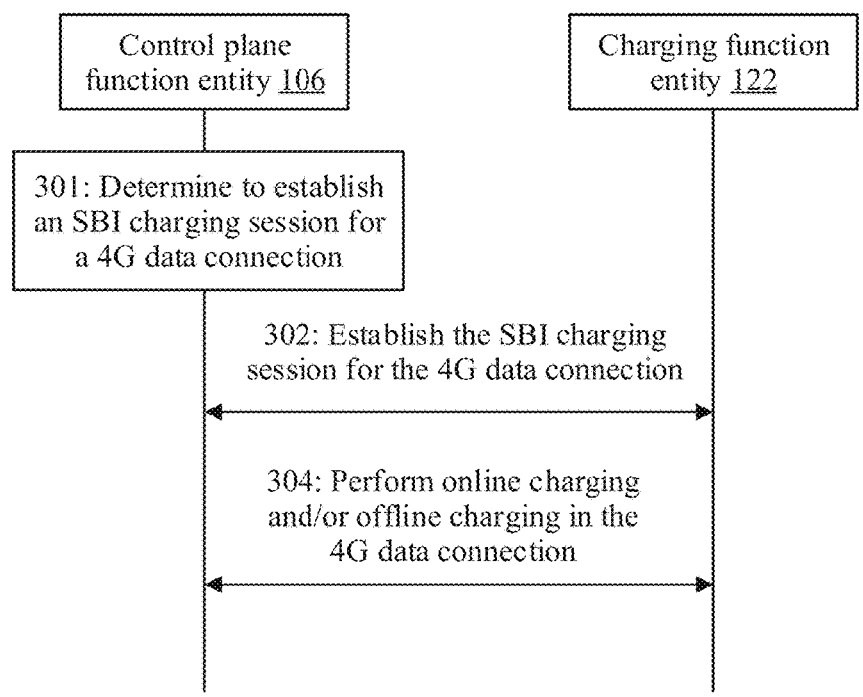
FIG. 3A is a schematic flowchart of a charging method for a 4G data connection according to an embodiment of this disclosure.

FIG. 3A is a schematic flowchart of a charging method for a 4G data connection according to an embodiment of this application. In this embodiment, a terminal 114 may be a 4G terminal that supports a 4G network, or may be a terminal that supports both a 4G network and a 5G network. The charging method in this embodiment includes the following steps.

Step 301: A control plane function entity 106 determines to request a charging function entity 122 to establish a service-based interface SBI charging session for the 4G data connection.

The 4G data connection may be a 4G data connection that is being established, or may be an established 4G data connection. The 4G data connection that is being established is a 4G data connection that is established by the control plane function entity based on a request for establishing the 4G data connection after receiving the request for establishing the 4G data connection.

Step 302: The control plane function entity 106 and the charging function entity 122 establish the service-based interface (service basic interface, SBI) charging session for the 4G data connection.

Specifically, the control plane function entity 106 may send a charging service establishment message to the charging function entity 122, to request to establish the SBI charging session for the 4G data connection. The charging function entity 122 returns a charging session establishment response message to the control plane function entity 106 to complete establishment of the SBI charging session.

Step 304: The control plane function entity 106 and the charging function entity 122 perform online charging and/or offline charging in the 4G data connection by using the SBI charging session.

According to the method, the SBI charging session that is established by the control plane function entity 106 and the charging function entity 122 for the 4G data connection may support the online charging in the 4G data connection, and support the offline charging in the 4G data connection. Therefore, this simplifies a procedure of charging online data and offline data in the 4G data connection in the 4G network by using different charging sessions.

Figure 3B:
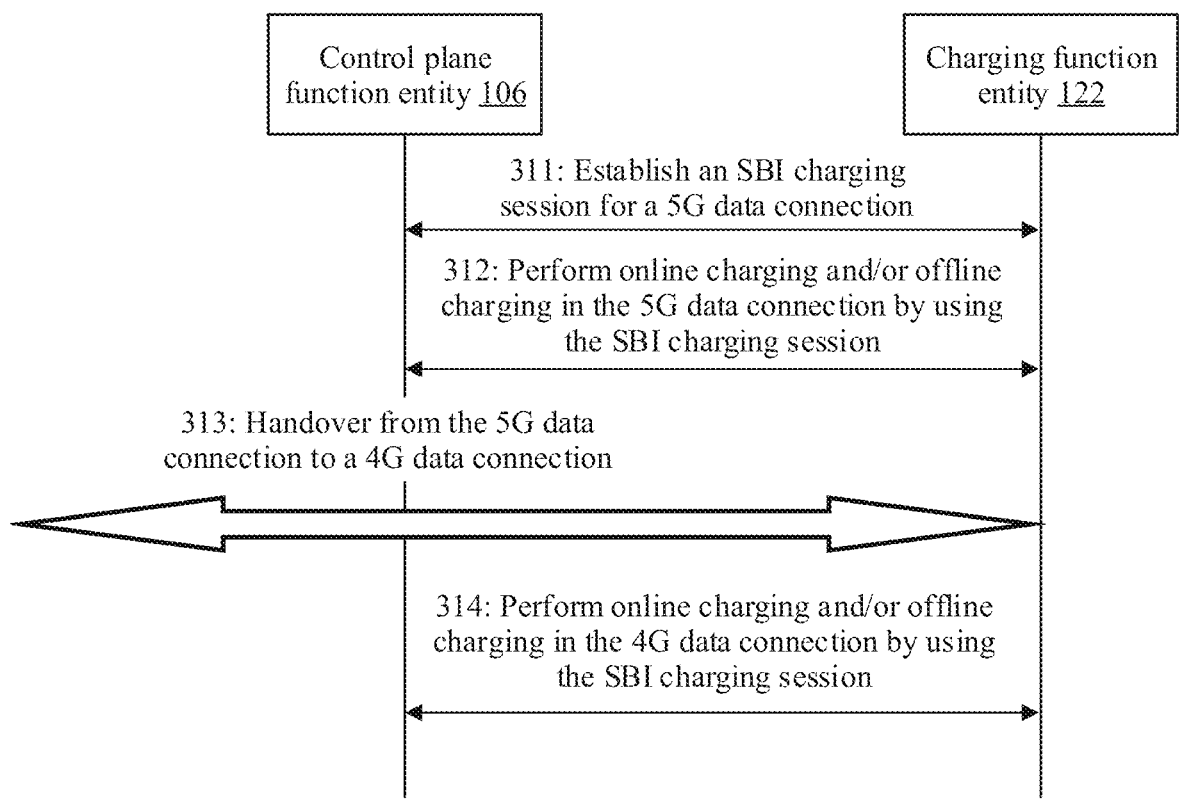
FIG. 3B is a schematic flowchart of a charging method when a terminal is handed over from a 5G data connection to a 4G data connection according to an embodiment of this disclosure.

FIG. 3B is a schematic flowchart of a charging method when a terminal is handed over from a 5G data connection to a 4G data connection according to an embodiment of this application. In this embodiment, a 5G network is first accessed, and the 5G connection is established in the 5G network. Subsequently, a terminal 114 gains access to a 4G network, and establishes the 4G data connection in the 4G network. The method includes the following steps.

Step 311: A control plane function entity 106 and a charging function entity 122 establish a service-based interface (service basic interface, SBI) charging session for the 5G data connection.

The establishing an SBI charging session includes: The control plane function entity 106 sends a charging service establishment message to the charging function entity 122 through an SBI. The charging service establishment request message is used to request to establish the SBI charging session for the 5G data connection. The charging function entity 122 returns a charging session establishment response message to the control plane function entity 106 to complete establishment of the SBI charging session.

Step 312: The control plane function entity 106 and the charging function entity 122 perform online charging and/or offline charging in the 5G data connection by using the SBI charging session.

Specifically, the control plane function entity 106 requests, through the SBI charging session, to perform the online charging and/or the offline charging in the 5G data connection. The charging function entity 122 performs the online charging and/or the offline charging in the 5G data connection based on the request of the control plane function entity 106.

Step 313: The terminal 114 is handed over from the 5G data connection to the 4G data connection.

Step 314: After the handover from the 5G data connection the 4G data connection, the control plane function entity 106 and the charging function entity 122 perform online charging and/or offline charging in the 4G data connection by using the SBI charging session.

Specifically, the control plane function entity 106 requests, through the SBI charging session, to perform the online charging and/or the offline charging in the 4G data connection. The charging function entity 122 performs the online charging and/or the offline charging in the 4G data connection based on the request of the control plane function entity 106.

Figure 5A:
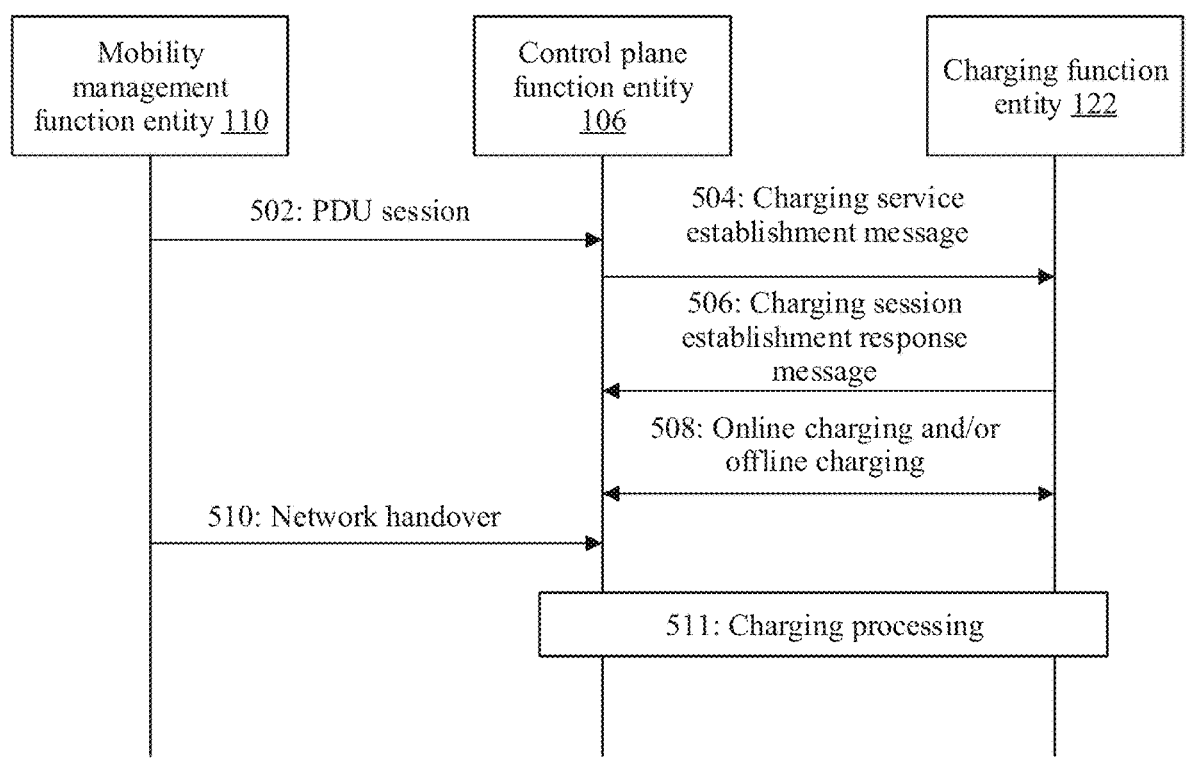
FIG. 5A is a schematic flowchart of a charging method when a terminal is handed over from a 5G network to a 4G network according to an embodiment of this disclosure.
Figure 5B:
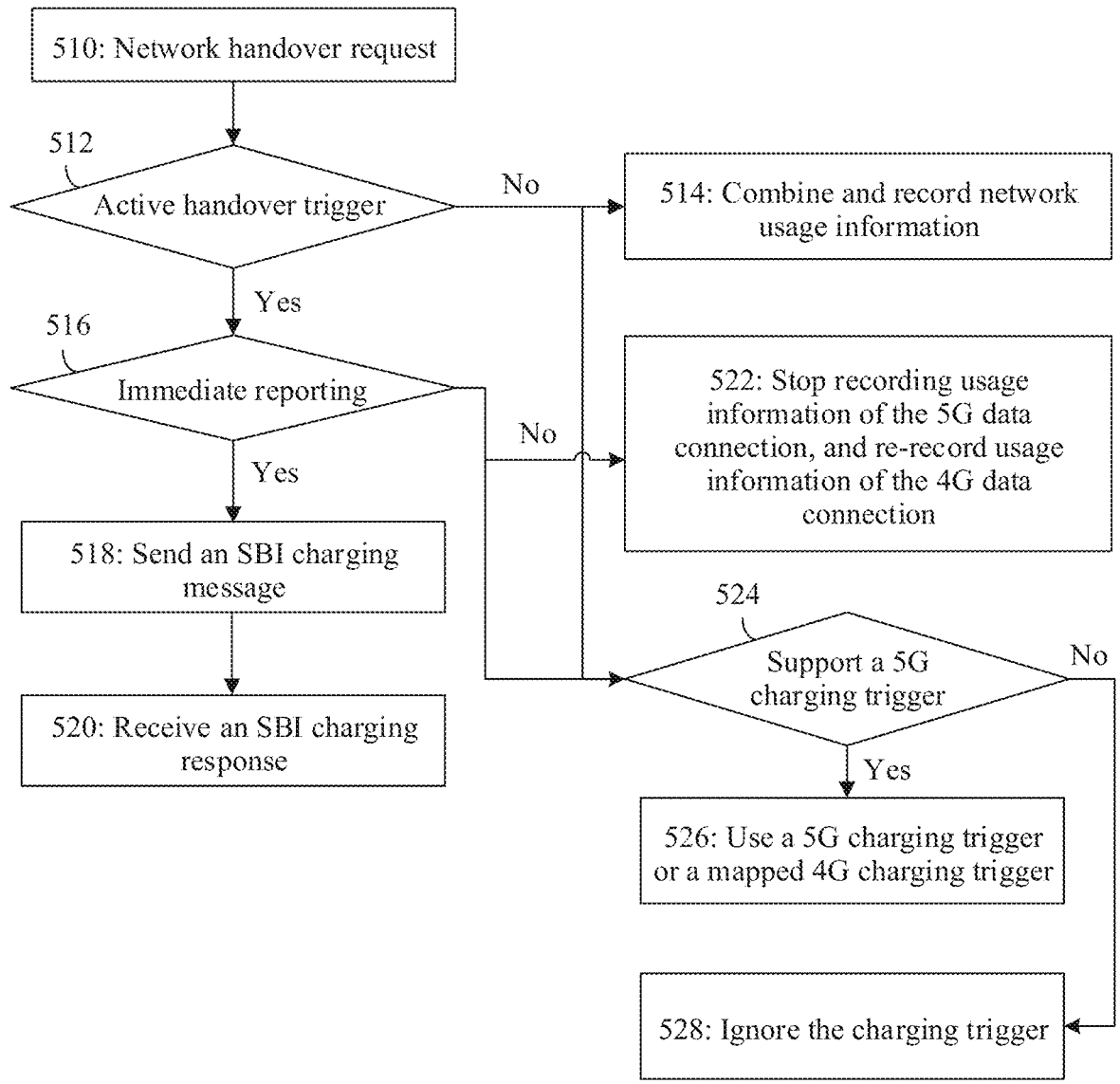
FIG. 5B is a schematic flowchart of charging processing after a network handover request for handling over a 5G data connection to a 4G data connection is received according to an embodiment of this disclosure.

Optionally, the control plane function entity 106 may perform processing performed by a control plane function entity 106 in FIG. 5A and FIG. 5B. The charging function entity 122 may perform processing performed by a charging function entity 122 in FIG. 5A and FIG. 5B.

According to the foregoing method, the control plane function entity 106 may charge, by using the SBI charging session established for the 5G data connection, network usage of the 4G data connection after the handover. In this way, there is no need to re-establish a charging session for the 4G data connection after the handover, thereby simplifying a network handover and charging procedure.

Optionally, the control plane function entity 106 in FIG. 3B may perform steps performed by a control plane function entity 106 in FIG. 4A to FIG. 4D. The charging function entity 122 may perform steps performed by a charging function entity 122 in FIG. 4A to FIG. 4D. Therefore, the method provided in FIG. 3B may be further applicable to a scenario in which charging is performed when the terminal 114 is handed over from a 4G data connection to a 5G data connection.

Figure 3C:
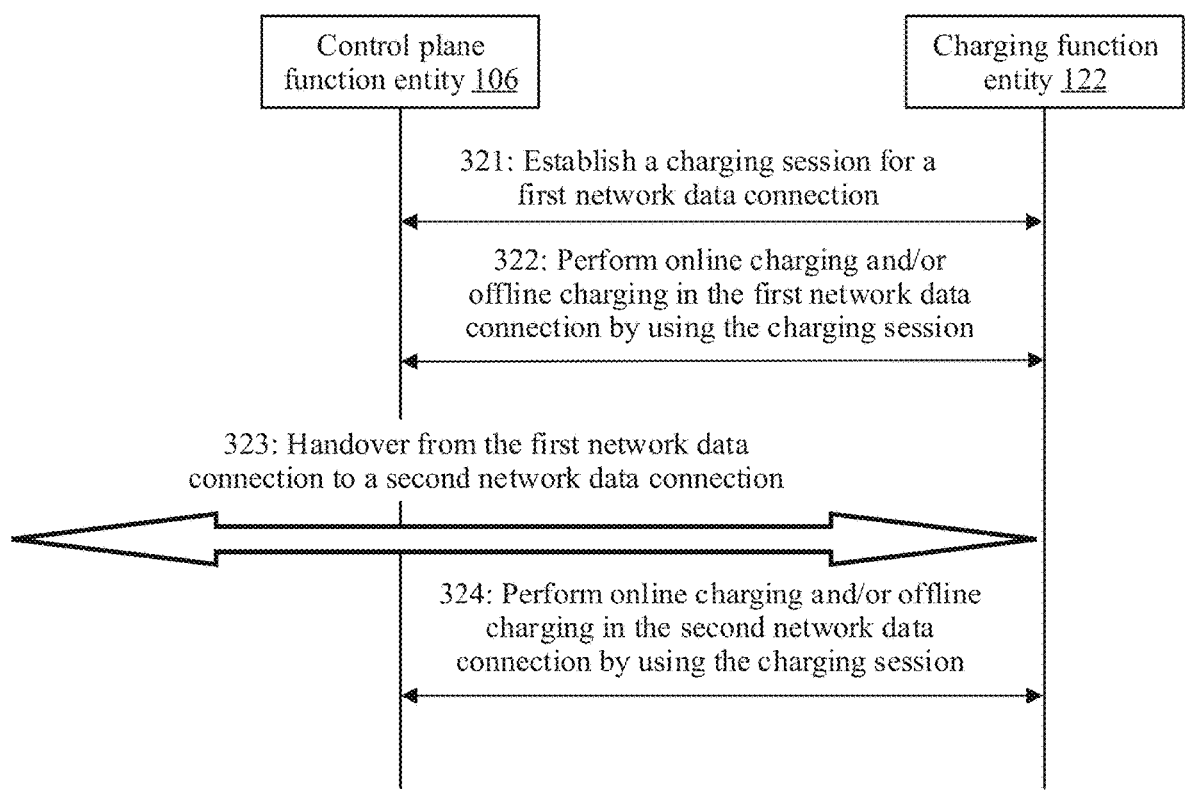
FIG. 3C is a schematic flowchart of a charging method when a terminal is handed over from a first network data connection to a second network data connection according to an embodiment of this disclosure.

FIG. 3C is a schematic flowchart of a charging method when a terminal is handed over from a first network data connection to a second network data connection according to an embodiment of this application. In this embodiment, a terminal 114 first gains access to a first network, and establishes the first network connection in the first network. Subsequently, the terminal 114 gains access to the second network. The first network may be a 4G network, and the second network may be a 5G network. Alternatively, the second network may be a 4G network, and the first network may be a 5G network. The method includes the following steps.

Step 321: A control plane function entity 106 and a charging function entity 122 establish a charging session for the first network data connection.

The establishing a charging session includes: The control plane function entity 106 sends a charging establishment message to the charging function entity 122. The charging establishment request message is used to request to establish the charging session for the first network data connection. The charging function entity 122 returns a charging session establishment response message to the control plane function entity 106 to complete establishment of the charging session.

Step 322: The control plane function entity 106 and the charging function entity 122 perform online charging and/or offline charging in the first network data connection by using the charging session.

Specifically, the control plane function entity 106 requests, through the charging session, to perform the online charging and/or the offline charging in the first network data connection. The charging function entity 122 performs the online charging and/or the offline charging in the first network data connection based on the request of the control plane function entity 106.

Step 323: The terminal 114 is handed over from the first network data connection to the second network data connection.

Step 324: After the handover from the first network data connection to the second network data connection, the control plane function entity 106 and the charging function entity 122 perform online charging and/or offline charging in the second network data connection by using the charging session.

Specifically, the control plane function entity 106 requests, through the charging session, to perform the online charging and/or the offline charging in the second network data connection after the handover. The charging function entity 122 performs the online charging and/or the offline charging in the second network data connection based on the request of the control plane function entity 106.

In an optional manner, the first network is the 4G network, and the second network may be the 5G network. The control plane function entity 106 may perform processing performed by a control plane function entity 106 in FIG. 4A to FIG. 4D. The charging function entity 122 may perform processing performed by a charging function entity 122 in FIG. 4A to FIG. 4D.

In an optional manner, the first network is the 5G network, and the second network is the 4G network. The control plane function entity 106 may perform processing performed by a control plane function entity 106 in FIG. 5A and FIG. 5B. The charging function entity 122 may perform processing performed by a charging function entity 122 in FIG. 5A and FIG. 5B.

In an optional manner, the charging session may be a 4G charging session, or may be a 5G charging session. A charging session established for the 4G data connection is the 4G charging session, and a charging session established for the 5G data connection is the 5G charging session.

According to the method provided in FIG. 3C, the charging function entity may charge, by using the charging session established for the first network data connection, network usage of the second network data connection after the handover. In this way, there is no need to re-establish a charging session for the 5G data connection after the handover, thereby simplifying a network handover procedure.

Figure 4A:
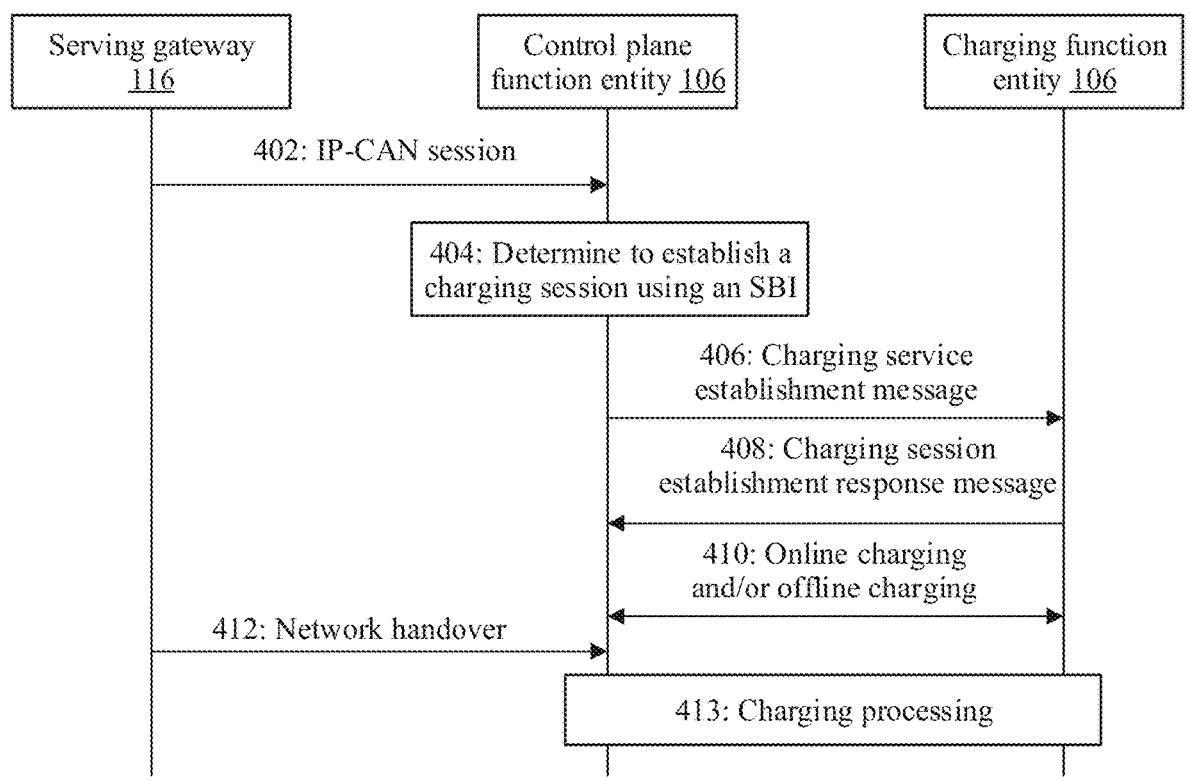
FIG. 4A is a schematic flowchart of a charging method when a terminal is handed over from a 4G network to a 5G network according to an embodiment of this disclosure.

FIG. 4A is a schematic flowchart of a charging method when a terminal 114 is handed over from a 4G network to a 5G network according to an embodiment of this application. In this embodiment, the terminal 114 first gains access to the 4G network by using an E-UTRAN device, and establishes a PDN connection or an IP-CAN session connection in the 4G network. The following uses the IP-CAN session connection as an example. After gaining access to the 4G network, the terminal 114 gains access to the 5G network by using an NG-RAN device. The method includes the following steps.

Step 402: A serving gateway 110 initiates, to a control plane function entity 106, a request for establishing an IP-CAN session.

The request for establishing the IP-CAN session is referred to as a request for establishing a 4G data connection. A packet data network gateway control plane function of the control plane function entity 106 receives, from the serving gateway 110, the request for establishing the 4G data connection. The request for establishing the 4G data connection is used to request to establish the 4G data connection for the terminal 114.

After the terminal 114 initiates establishment of the 4G data connection, the serving gateway 110 may initiate, to the control plane function entity 106, the request for establishing the 4G data connection.

The 4G data connection may be established by the terminal 114 in an attach process, or may be established by the terminal 114 after the terminal 114 is attached. For a process of establishing the IP-CAN session connection, refer to an existing protocol (for example, 3GPP TS 23 23.401). Details are not described herein.

Step 404: The control plane function entity 106 determines to request a charging function entity 122 to establish an SBI charging session for the 4G data connection. The 4G data connection may be an IP-CAN session connection that is being established, or an established IP-CAN session connection.

After the control plane function entity 106 receives the request for establishing the IP-CAN session from the serving gateway 116, or after a charging session of the IP-CAN session is released in a life cycle of the IP-CAN session, when the control plane function entity 106 determines to re-establish a charging session, step 404 is performed.

After receiving the request for establishing the 4G data connection, the control plane function entity 106 determines that the terminal 114 may be subsequently handed over to the 5G network, and determines to request the charging function entity 122 to establish the SBI charging session. It should be noted that the terminal 114 may establish one or more IP-CAN session connections in the 4G network, and the one or more IP-CAN session connections may be supported by one or more control plane function entities 106. This is not limited in this embodiment of this application. For ease of description, in this embodiment of this application, only an example in which the terminal 114 establishes the IP-CAN session connection by using one control plane function entity is used.

The control plane function entity 106 requests to establish the SBI charging session with an IP-CAN session granularity for the IP-CAN session. The SBI charging session is used to send a charging update message of online and/or offline (for example, online, or offline, or online and offline) charging content of the IP-CAN Session. That the charging session granularity is an IP-CAN session means that one IP-CAN session corresponds to one charging session.

Figure 4B:
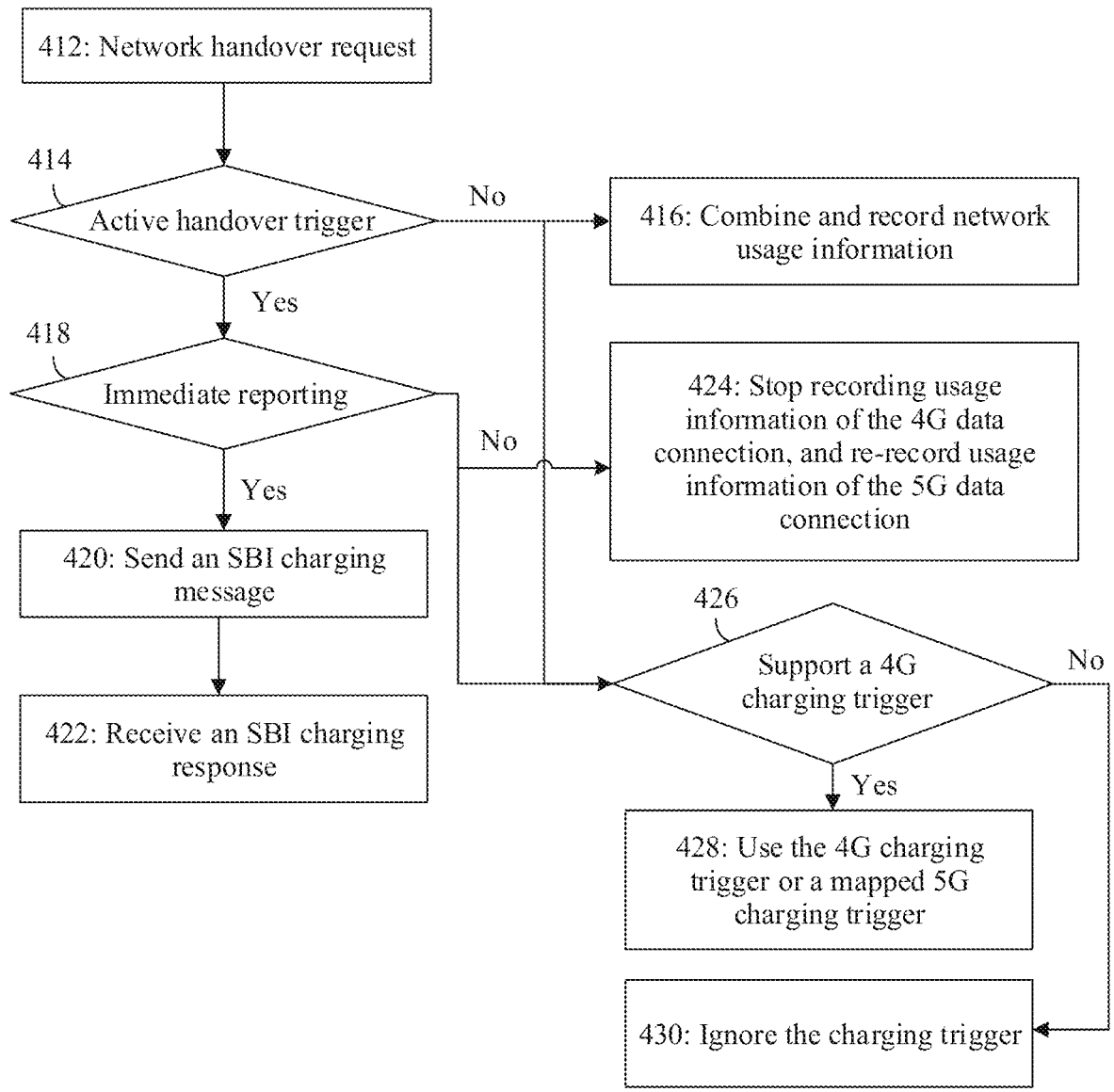
FIG. 4B is a schematic flowchart of charging processing after a network handover request for handling over a 4G data connection to a 5G data connection is received according to an embodiment of this disclosure.
Figures 4C, 4D:
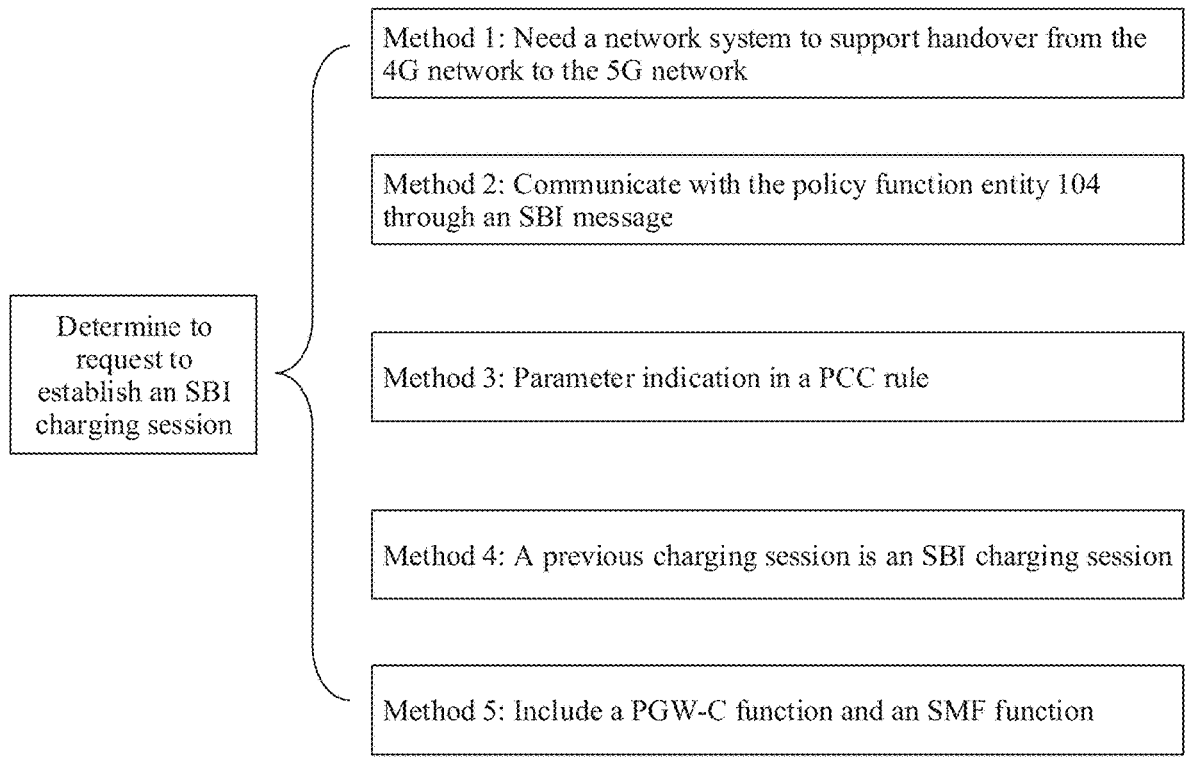
FIG. 4C is a schematic diagram of determining, by a control plane function entity, to request a charging function entity to establish an SBI charging session for a 4G data connection according to an embodiment of the present disclosure.
FIG. 4D is a charging trigger mapping table in which a 5G charging trigger is mapped to a 4G charging trigger.

After receiving the request for establishing the IP-CAN session connection, the control plane function entity 106 determines to request the charging function entity to establish the SBI charging session, which may be that shown in FIG. 4C.

Step 406: The control plane function entity 106 sends a charging service establishment message to the charging function entity 122 through an SBI, to request to establish the SBI charging session for the 4G data connection.

Because the SBI charging session is established for the 4G data connection, a PGW-C of the control plane function entity 106 sends the charging service establishment message to the charging function entity 122. The SBI charging session established based on the charging service establishment message supports performing online charging and/or performing offline charging in the 4G data connection. The SBI charging session established for the 4G data connection refers to a 4G charging session.

The 4G charging session that the control plane function entity 106 requests to establish interacts with the charging function entity 122 by using an SBI message. Therefore, a service provided by the charging function entity 122 is invoked to create and update a charging resource. The charging function entity may complete charging processing on all data flows of the 4G data connection in one 4G charging session, and the charging processing includes charging processing such as online charging and/or offline charging on the data flows.

After determining to send the charging service establishment message to the charging function entity 122 through the SBI, the control plane function entity 106 obtains an address of the charging function entity 122, and sends the charging service establishment message through the SBI to the charging function entity 122 based on the obtained address to request to establish the 4G charging session with the charging function entity 122.

If the control plane function entity 106 determines not to send the charging function entity 122 the charging service establishment message through the SBI, the control plane function entity 106 obtains an address of a 4G online charging system or a 4G offline charging system. The control plane function entity 106 initiates, to the 4G-OCS, a request for establishing a diameter online charging session for an online charging data flow in the IP-CAN session, and initiates, to the 4G-OFCS, a request for establishing a diameter offline charging session for an offline charging data flow in the IP-CAN session. That the control plane function entity 106 determines not to send the charging function entity 122 the charging service establishment message through the SBI may be: The control plane function entity 106 determines that the IP-CAN session connection does not need to support interworking, the control plane function entity 106 is not an integrated entity of a PGW-C entity and an SM entity, or others.

In the foregoing optional manner, the control plane function entity 106 may obtain the address of the charging function entity 122 in any one of the following manners. For example, the control plane function entity 106 obtains the address of the charging function entity 122 from a PCC rule, the control plane function entity 106 obtains the address of the charging function entity 122 from a unified data management entity, or the control plane function entity 106 obtains the address of the charging function entity 122 through query from a network repository function (Network Repository Function, NRF) entity.

Step 408: The charging function entity 122 sends a charging session establishment response message for the 4G data connection (the IP-CAN session) to the control plane function entity 106.

The charging session establishment response message includes a charging parameter for the 4G data connection (the IP-CAN session connection). The charging parameter for the 4G data connection includes a quota granted to a rate group in the 4G data connection, a data reporting threshold, a 4G charging trigger, and the like. The rate group includes one or more rates corresponding to online data (for example, a rate corresponding to use of an app A, and a rate corresponding to use of an app B), and/or one or more rates corresponding to offline data (for example, a rate corresponding to use of an app A, and a rate corresponding to use of an app B).

Figure 6A:
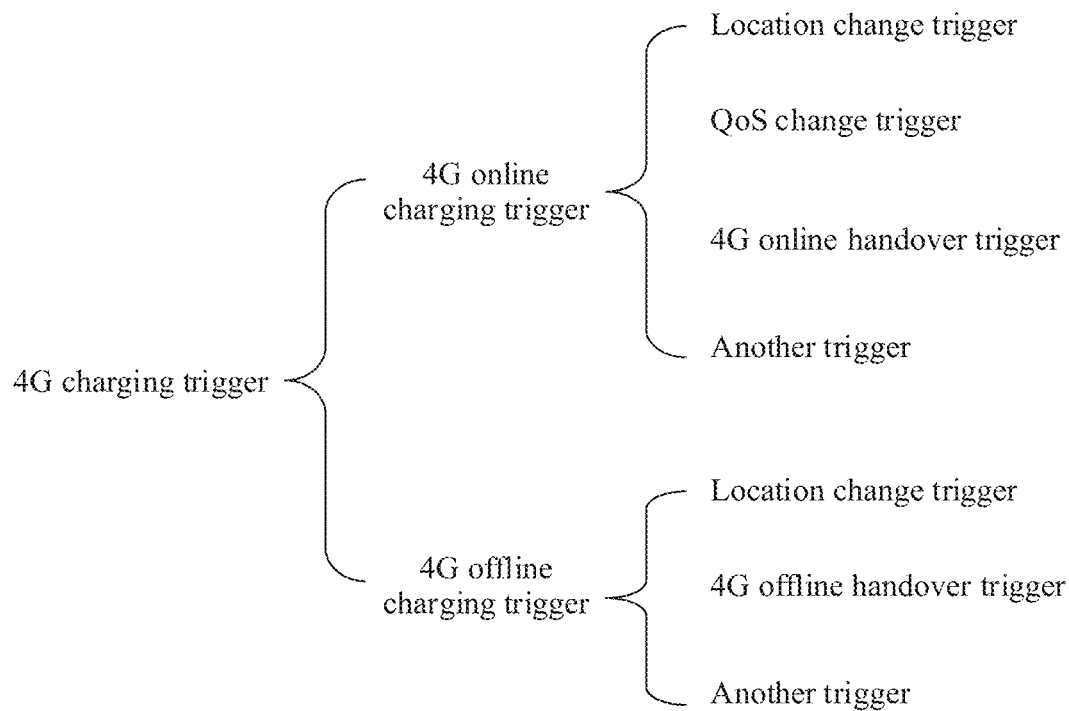
FIG. 6A is a schematic diagram of triggers included in a 4G charging trigger according to an embodiment of this disclosure.

Referring to FIG. 6A, the 4G charging trigger includes a 4G online charging trigger and a 4G offline charging trigger. The 4G online charging trigger is used to trigger quota application or quota usage reporting. The 4G online charging trigger may include one or more triggers, for example, a location change trigger, a QoS change trigger, a 4G online handover trigger, or another trigger. The 4G offline charging trigger is used to trigger disabling or reporting of an offline charging data record. The 4G offline charging trigger may include one or more triggers, for example, a location change trigger, a 4G offline handover trigger, or another trigger.

Because the charging trigger is obtained by the terminal 114 after the terminal 114 gains access to the 4G network, the charging trigger is referred to as a 4G charging trigger. A handover trigger of the 4G online charging trigger is referred to as the 4G online handover trigger for short. A handover trigger of the 4G offline charging trigger is referred to as the 4G offline handover trigger for short. The 4G online handover trigger and the 4G offline handover trigger are collectively referred to as a 4G handover trigger.

A type of the 4G handover trigger is immediate reporting trigger by default. The charging function entity 122 may activate the 4G handover trigger as default immediate reporting, or may specify the 4G handover trigger as deferred reporting. The charging function entity 122 may further deactivate the 4G handover trigger.

The control plane function entity 106 stores the 4G charging trigger delivered by the charging function entity 122, and the 4G charging trigger includes the 4G online charging trigger and/or the 4G offline charging trigger.

Step 410: The control plane function entity 106 requests the charging function entity 122 to perform online charging and/or offline charging in the 4G data connection (for example, the IP-CAN session).

Specifically, the control plane function entity 106 sends the charging update message of the IP-CAN session to the charging function entity based on the charging parameter in the charging session response message for the 4G data connection (the IP-CAN session).

The charging parameter includes an active charging trigger and other charging information, such as a quota. The control plane function entity 106 monitors the active charging trigger for the 4G data connection, and sends the charging update message of the IP-CAN session to the charging function entity 106 when the 4G charging trigger is satisfied.

After the control plane function entity 106 and the charging function entity 122 establish the SBI charging session for the 4G data connection (for example, the IP-CAN session connection), the charging function entity 122 may further deliver the update message to update a type of the 4G online handover trigger and/or the 4G offline handover trigger to deferred reporting.

Step 412: The serving gateway 116 sends a network handover request to the control plane function entity 106, where the network handover request is used to request the terminal 114 to hand over from the 4G data connection to the 5G data connection.

After the terminal 114 initiates to hand over from the accessed 4G network to the 5G network, the serving gateway 116 sends the network handover request to the control plane function entity 106. The handover from the 4G network to the 5G network indicates handover from the 4G data connection to the 5G data connection in the 5G network, or handover of a service data flow of the terminal 114 from the 4G data connection to the 5G data connection in the 5G network.

After the control plane function entity 106 receives the network handover request sent by the serving gateway 116, the control plane function entity 106 performs step 413 of charging processing. For a specific processing procedure, refer to FIG. 4B.

FIG. 4B is a schematic flowchart of charging processing after a network handover request for handling over a 4G data connection to a 5G data connection is received according to an embodiment of this application. Step 413 in FIG. 4A includes step 414 and all procedures after step 414 in FIG. 4B. The method includes the following steps.

Step 412: A serving gateway 116 sends the network handover request to a control plane function entity 106, where the network handover request is used to request a terminal 114 to hand over from the 4G data connection to the 5G data connection.

Step 414: During handover from the 4G data connection to the 5G data connection, the control plane function entity 106 determines whether a state of a 4G handover trigger is an active state. If the 4G handover trigger is in the active state, step 418 is performed. If the 4G handover trigger is not in the active state, step 416 and step 424 are performed.

The handover from the 4G data connection to the 5G data connection is performed after the control plane function entity 106 receives the network handover request. The network handover request may be sent to the control plane function entity 106 by another network entity such as the serving gateway 116 after the terminal 114 initiates network handover.

The state of the 4G handover trigger may be configured on the control plane function entity 106, or may be obtained by the control plane function entity 106 from another network entity such as a policy control entity 104, or may be updated and delivered by a charging function entity 122.

Step 416: After the handover from the 4G data connection to the 5G data connection, the control plane function entity 106 records network usage information of the 4G data connection and network usage information of the 5G data connection.

That the 4G handover trigger is in an inactive state may be determining that there is no active 4G handover trigger. For example, if the 4G handover trigger is disabled by the charging function entity 122, the 4G handover trigger is in the inactive state.

Further, for the 5G data connection on which online charging is performed, the control plane function entity 106 continues to use a quota that is applied for the 4G data connection for the 5G data connection after the handover. The control plane function entity 106 disables a 4G service usage counter, buffers charging information of the 4G data connection, and starts to collect charging information of a 5G QoS flow.

Step 418: The control plane function entity 106 determines whether a type of the 4G handover trigger is immediate reporting. If the type of the 4G handover trigger is immediate reporting, step 420 is performed; otherwise, step 424 is performed.

The determining that the 4G handover trigger does not need immediate reporting includes that the type of the 4G handover trigger is deferred reporting.

Step 420: The control plane function entity 106 sends a charging update message to the charging function entity 122. The charging update message is used to report the usage information of the 4G data connection network. The charging update message is sent through a 4G charging session.

The usage information in the 4G network includes 4G data usage, 4G network usage duration, and/or 4G data connection information (such as QoS and a user location). The 4G data usage includes 4G online charging data flow usage and/or 4G offline charging data flow usage.

After determining that the type of the 4G handover trigger is immediate reporting, when the 4G handover trigger is satisfied, the control plane function entity 106 sends the charging update message to the charging function entity 122 to report the network usage information of the 4G data connection. Generally, after receiving the network handover request, the control plane function entity 106 determines that the 4G handover trigger is satisfied. The 4G charging trigger may be preconfigured in the control plane function entity 106, or may be a 4G charging trigger carried in the update message delivered by the charging function entity 122.

Step 422: The control plane function entity 106 receives a charging update response message sent by the charging function entity 122.

After the control plane function entity 106 determines that the type of the 4G handover trigger is immediate reporting, and reports the usage information of the 4G network of a rate group corresponding to the 4G handover trigger, the charging function entity 122 re-delivers a 5G charging trigger for the 4G handover trigger. The control plane function entity 106 uses the 5G charging trigger for the 5G network. For content included in the 5G charging trigger, refer to FIG. 6B.

The charging update response message includes the 5G charging trigger, a quota for 5G network access, and/or the like.

Step 424: The control plane function entity 106 stops the count of the usage information of the 4G data connection in the 4G network, and starting a new count of the usage information of the 5G data connection in the 5G network.

For example, the control plane function entity 106 disables the service usage counter and buffers the network usage information of the IP-CAN session connection of the terminal 114 in the 4G network, and starts to record the network usage information of the quota in the 5G network by using a new service usage counter. For the data flow on which the online charging is performed, the control plane function entity 106 continues to use the quota applied for the 4G data connection for the 5G data connection of the terminal 114.

Step 426: The control plane function entity 106 determines whether the 5G network supports the active 4G charging trigger for the 4G data connection. If the 5G network supports the activated 4G charging trigger for the 4G data connection, step 428 is performed; otherwise, step 430 is performed.

That the control plane function entity 106 determines whether to support the active 4G charging trigger for the 4G data connection includes: The control plane function entity 106 determines that the 5G charging trigger includes the 4G charging trigger; or the control plane function entity 106 determines whether the 5G charging trigger may be mapped to the 4G charging trigger. If the 5G charging trigger includes the 4G charging trigger, or the 5G charging trigger may be mapped to the 4G charging trigger, the 5G network supports the active 4G charging trigger for the 4G data connection.

The control plane function entity 106 may determine, based on a charging trigger mapping table shown in FIG. 4D, whether the active 4G charging trigger for the 4G data connection may be mapped to the 5G charging trigger. The charging trigger mapping table may be preconfigured in the control plane function entity 106, or may be obtained by the control plane function entity 106 from another network entity. For example, the control plane function entity 106 obtains the charging trigger mapping table from a policy control entity 106, or obtains the charging trigger mapping table from the charging function entity 122.

FIG. 4D is a charging trigger mapping table in which a 5G charging trigger is mapped to a 4G charging trigger. The mapping table lists a 5G charging trigger and a 4G charging trigger that can be mapped. In an example, if a 4G charging trigger value CHANGE_IN_SERVING_NODE may be mapped to a 5G charging trigger value SERVING_NODE_CHANGE, the 5G charging trigger may be mapped to the 4G charging trigger.

It should be noted that the 5G charging trigger and the 4G charging trigger that can be mapped and that are listed in FIG. 4D are merely examples. FIG. 4D may further include another 5G charging trigger value that can be mapped to another 4G charging trigger value.

Step 428: The control plane function entity 106 requests to perform charging by using the 4G charging trigger or the mapped 5G charging trigger.

If the 5G network includes the 4G charging trigger, the control plane function entity 106 continues to use the 4G charging trigger for the 5G data connection.

If the control plane function entity 106 determines that the 5G charging trigger may be mapped to the 4G charging trigger, the control plane function entity 106 uses the mapped 5G charging trigger for the 5G data connection.

Step 430: The control plane function entity 106 ignores, in the 5G data connection, the 4G charging trigger.

If the control plane function entity 106 determines that the 5G network does not include the 4G charging trigger, and the 5G charging trigger cannot be mapped to the 4G charging trigger, the control plane function entity 106 ignores, in the 5G data connection, the 4G charging trigger.

It should be noted that, in the foregoing method, steps 416 and 418 are selectively performed based on the active state and the type of the 4G handover trigger, but have no sequence. There is no sequence between step 416 and step 426, and between step 424 and step 426.

In this embodiment of this application, the control plane function entity 106 requests the charging function entity 122 to establish the SBI charging session for the 4G data connection (for example, the IP-CAN session connection) of the terminal 114 in the 4G network. The SBI charging session may support performing the online charging in the 4G data connection, and support performing the offline charging in the 4G data connection. In this way, when the handover is performed on a data connection, the charging session remains unchanged. The control plane function entity 106 may perform, based on a charging requirement of the charging function entity, corresponding charging processing on the 5G data connection after the handover, to ensure charging continuity and accuracy in a process in which the terminal 114 is handed over from the 4G network to the 5G network, and improve service experience of a user.

FIG. 4C is a schematic diagram of performing, by a control plane function entity 106, the step 404, in FIG. 4A, of determining to request the charging function entity 122 to establish the SBI charging session for the 4G data connection according to an embodiment of the present disclosure. As shown in FIG. 4C, the control plane function entity 106 may determine to request the charging function entity 122 to establish the SBI charging session in the following five optional methods.

Optional Method 1:

The control plane function entity 106 determines that the IP-CAN session needs a network system to support handover of the terminal 114 from the 4G network to the 5G network. The control plane function entity 106 determines to request to establish the SBI charging session for the 4G data connection.

That the control plane function entity 106 determines that the IP-CAN session needs the network system to support the handover of the terminal 114 from the 4G network to the 5G network includes: Based on a 5G system interworking indication parameter in the request for establishing the 4G data connection, the control plane function entity 106 determines that the terminal 114 supports gaining access to the 5G network, and/or determines that the 5G system interworking indication (5GS Interworking Indication) parameter allows the terminal 114 to be handed over to the 5G network. For example, if the 5G system interworking indication parameter indicates that the terminal 114 supports an N1 mode, it may be determined that the terminal 114 supports gaining access to the 5G network. The 5G system interworking indication parameter may be different values of one parameter to indicate that the terminal 114 supports gaining access to the 5G network and/or allow the terminal 114 to be handed over to the 5G network.

In another optional manner in the optional method 1, the control plane function entity 106 may further determine, based on user information, to allow the terminal 114 of the user to be handed over between the 4G network and the 5G network. The control plane function entity 106 may obtain the user information from a home subscriber server, a user information library (Subscription Profile Repository, SPR), or a user data repository (User Data Repository, UDR).

Optional method 2: After receiving the request for establishing the IP-CAN session, if the control plane function entity 106 determines to communicate with the policy function entity 104 through an SBI message, the control plane function entity 106 determines to request to establish the SBI charging session for the 4G data connection. For example, the control plane function entity 106 initiates a policy control session to the policy function entity 104 through the SBI message. If the control plane function entity 106 does not use the SBI message to initiate the policy control session to the policy function entity 104, the control plane function entity 106 initiates a request for establishing an Ro charging session or a request for establishing an Rf charging session to a 4G online charging system (4G online charging system, 4G OCS) or a 4G offline charging system (4G offline charging system, 4G-OFCS) respectively.

Optional method 3: The control plane function entity 106 determines, based on a parameter in a policy and charging control rule (policy and charging control rule, PCC rule) delivered (installed) by a policy function entity 104, to request the charging function entity 122 to establish the SBI charging session for the 4G data connection. Alternatively, the control plane function entity 106 determines, based on a parameter in a PCC rule that is configured and activated by a policy function entity 104, to request the charging function entity 122 to establish the SBI charging session for the 4G data connection. For example, the control plane function entity 106 determines, based on indication information, for sending a service charging establishment message to the charging function entity 122, included in the PCC rule, or an address, of the charging function entity 106, included in the PCC rule, to request the charging function entity 122 to establish the SBI charging session. If the PCC rule includes an address of the 4G online charging system entity or an address of the 4G offline charging system, the control plane function entity 106 initiates a request for establishing an Ro charging session or a request for establishing an Rf charging session to the 4G online charging system or the 4G offline charging system entity by using a diameter respectively.

When the optional method 3 is performed, the control plane function entity 106 determines, based on a data type of the address included in the PCC rule, whether the address is an address of the charging function entity 122. For example, if the address included in the PCC rule is defined in a domain name manner, for example, http://domain:port, the address is the address of the charging function entity 106.

Optional method 4: When the control plane function entity 106 re-establishes a charging session for an established IP-CAN session connection, the control plane function entity 106 determines, based on that a previous charging session of the IP-CAN session is a charging session established with the charging function entity 122, to request the charging function entity to establish the SBI charging session. For example, the control plane function entity 106 determines, based on a usage parameter (for example, an address, an interface, and a charging function entity that are used by the charging session) of a previously established charging session, that the previous charging session of the 4G data connection is the charging session established with the charging function entity.

Optional method 5: If the control plane function entity 106 determines that the control plane function entity 106 includes the PGW-C function and the SMF function, the control plane function entity 106 determines to request to establish SBI charging sessions for all IP-CAN session connections.

The foregoing optional methods may be used independently, or may be used in combination to determine whether to establish the session with the charging function entity 122 for the terminal 114. For example, the optional method 1 and the optional method 5 are used together. In addition, there is no priority relationship between the foregoing optional methods. A system may configure which method is used by the control plane function entity 106 during determining. If configuration of the system is determined, the control plane function entity 106 performs determining in a method configured by the system.

The foregoing optional methods provide sufficient flexibility for the control plane function entity 106 to determine to request to establish the SBI charging session. The foregoing optional methods can be used in more application scenarios to meet service requirements.

FIG. 5A is a schematic flowchart of a charging method when a terminal 114 is handed over from a 5G network to a 4G network according to an embodiment of this application. In this embodiment, the terminal 114 first gains access to the 5G network by using an NG-RAN device 112, and establishes a protocol data unit session (Protocol Data Unit, PDU session) connection in the 5G network. Subsequently, the terminal 114 gains access to the 4G network by using an E-UTAN device 120 because a location of the terminal 114 moves to a 4G service range, a signal of the 4G network is stronger than a signal of the 5G network at a location, or a user actively selects to use the 4G network. The method includes the following steps.

Step 502: A mobility management function entity 110 initiates a request for establishing a 5G data connection to a control plane function entity 106. A session management function of the control plane function entity 106 receives from the mobility management function entity 110, the request for establishing the 5G data connection, to request to establish the 5G data connection for the terminal 114. The 5G data connection may be a PDU session connection.

The mobility management function entity 110 may initiate the request for establishing the 5G data connection to the control plane function entity 106 after the terminal 114 initiates establishment of the 5G data connection. The PDU session connection may be established by the terminal 114 in an attach process, or may be established by the terminal 114 after the terminal 114 is attached. For a process of establishing the PDU session connection, refer to an existing protocol (for example, 3GPP TS 23.501). Details are not described herein.

Step 504: The control plane function entity 106 requests a charging function entity 122 to establish an SBI charging session for the 5G data connection. The 5G data connection may be a 5G data connection that is being established, or an established 5G data connection.

The control plane function entity 106 sends a charging service establishment message to the charging function entity 122 through a service-based interface (service based interface, SBI), to request to establish a 5G charging session for the 5G data connection. The 5G charging session is a charging session established for the 5G data connection.

The control plane function entity 106 establishes the 5G charging session for the PDU session after receiving the request, for establishing the PDU session, sent by the mobility management function entity 110 or within a life cycle of the PDU session. In the life cycle of the PDU session, the 5G charging session may be released. When the PDU session connection has a data flow that needs to be charged, and the control plane function entity 106 needs to re-establish a charging session, step 504 is performed.

The control plane function entity 106 obtains an address of the charging function entity 122, and sends the charging service establishment message to the charging function entity 122 based on the obtained address, to request to establish the charging session.

After receiving the request, for establishing the PDU session, sent by the mobility management function entity 110, the control plane function entity 106 obtains a policy and charging control rule (policy and charging control rule, PCC rule) from a policy control entity 104. The PCC rule includes address information of the charging function entity 122. In another possible manner, the control plane function entity 106 obtains the address of the charging function entity 122 based on a charging characteristic (charging characteristic) parameter included in the request for establishing the PDU session. The charging service establishment message carries an online charging parameter and/or an offline charging parameter.

Step 506: The charging function entity 122 sends a charging session establishment response message for the 5G data connection (the PDU session) to the control plane function entity 106.

The charging session establishment response message carries a charging parameter for the PDU session connection. The charging parameter for the 5G data connection includes a 5G charging trigger granted to a rate group in the 5G data connection, for example, a quota granted to the rate group in the 5G data connection or a data reporting threshold.

Figure 6B:
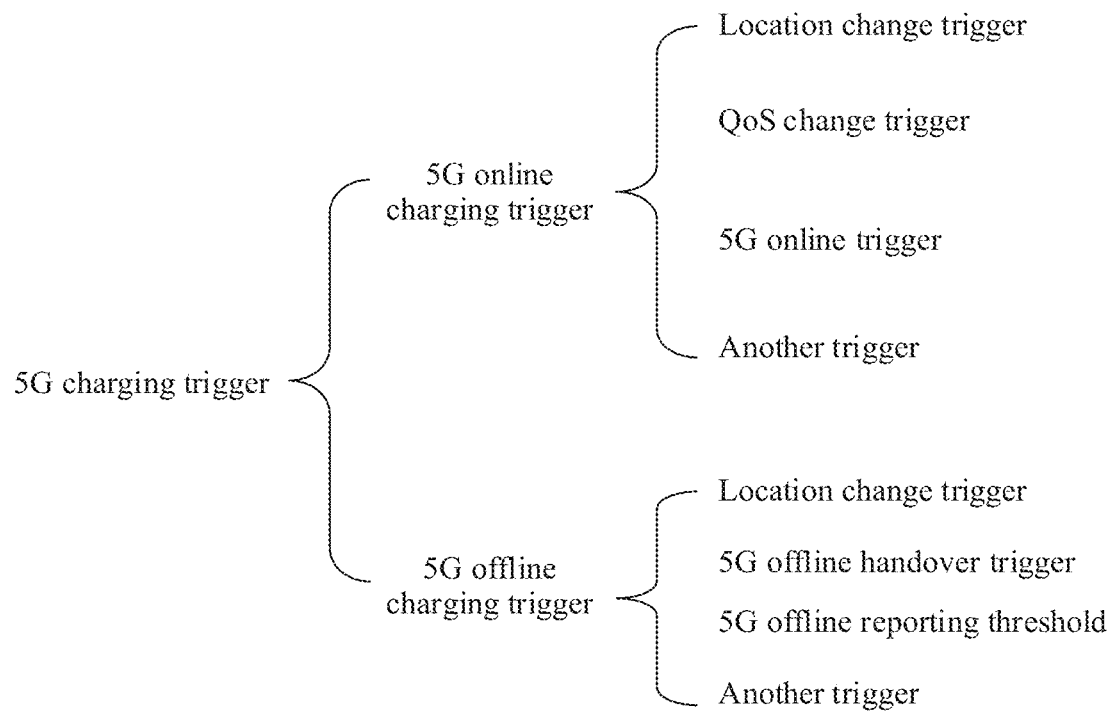
FIG. 6B is a schematic diagram of triggers included in a 5G charging trigger according to an embodiment of this disclosure.

Referring to FIG. 6B, the 5G charging trigger includes a 5G online charging trigger and a 5G offline charging trigger. The 5G online charging trigger is used to trigger quota application or quota usage reporting. The 5G online charging trigger may include one or more triggers, for example, a location change trigger, a QoS change trigger, a 5G online handover trigger, or another trigger. The 5G offline charging trigger is used to trigger disabling or reporting of an offline charging data record. The 5G offline charging trigger may include one or more triggers, for example, a location change trigger, a 5G offline handover trigger, a 5G offline reporting threshold trigger, and/or another trigger.

The 5G charging trigger is a charging trigger of the 5G data connection after the terminal 114 gains access to the 5G network. A handover trigger of the 5G online charging trigger is referred to as the 5G online handover trigger for short. A handover trigger of the 5G offline charging trigger is referred to as the 5G offline handover trigger for short. The 5G online handover trigger and the 5G offline handover trigger are collectively referred to as a 5G handover trigger. In other words, the 5G handover trigger includes the 5G online handover trigger and/or the 5G offline handover trigger.

The 5G charging trigger may be preconfigured in the control plane function entity 106, or may be an update 5G charging trigger carried in a trigger update message delivered by the charging function entity 122. The control plane function entity 106 may obtain the 5G online charging trigger and/or the 5G offline charging trigger, of the PDU connection, delivered by the charging function entity 122.

Step 508: The control plane function entity 106 requests the charging function entity 122 to perform online charging and/or offline charging in the 5G data connection (for example, the PDU session).

For example, the control plane function entity 106 monitors an active charging trigger, and sends a charging update message of the PDU session to the charging function entity 106 when the 5G charging trigger is satisfied. The charging function entity 122 performs the online charging and/or the offline charging on the PDU session based on the charging update message of the PDU session.

Further, after the control plane function entity 106 establishes the 5G charging session with the charging function entity 122, the charging function entity 122 may deliver an update message to update a type of the 5G online handover trigger and/or a type of the 5G offline handover trigger in the control plane function entity 106 to deferred reporting.

Step 510: The mobility management entity 110 sends a network handover request to the control plane function entity 106, where the network handover request is used to request the terminal 114 to hand over from the 5G data connection to the 4G data connection.

After the terminal 114 initiates the handover from the accessed 5G network to the 4G network, the mobility management entity 110 initiates the network handover to the control plane function entity 106. The handover from the 5G network to the 4G network indicates handover from the 5G data connection to the 4G data connection in the 4G network, or handover of a service data flow of the terminal 114 from the 5G data connection to the 4G data connection in the 4G network.

After the control plane function entity receives the network handover request sent by the mobility management entity 110, the control plane function entity 106 performs step 511 of charging processing. For a specific processing procedure, refer to FIG. 5B.

FIG. 5B is a schematic flowchart of charging processing after a network handover request for handling over a 5G data connection to a 4G data connection is received according to an embodiment of this application. Step 511 in FIG. 5A includes step 512 and all procedures after step 512 in FIG. 5B. The method includes the following steps.

Step 510: A mobility management entity 110 sends a network handover request to a control plane function entity 106, where the network handover request is used to request a terminal 114 to hand over from the 5G data connection to the 4G data connection.

After receiving the network handover request, the control plane function entity 106 performs the handover from the 5G data connection to the 4G data connection, for example, determines a type and a state of a 5G handover trigger, and/or requests to perform charging processing for the 5G data connection.

Step 512: During handover from the 5G data connection to the 4G data connection, the control plane function entity 106 determines whether a state of a 5G handover trigger is an active state. If the 5G handover trigger is in the active state, step 516 is performed. If the 4G handover trigger is not in the active state, step 514 and step 524 are performed.

The handover from the 5G data connection to the 4G data connection is performed after the control plane function entity 106 receives the network handover request. The network handover request may be sent to the control plane function entity 106 by another network entity such as the mobility management entity 110 after the terminal 114 initiates the network handover. During the handover from the 5G data connection to the 4G data connection, the control plane function entity 106 performs the handover from the 5G data connection to the 4G data connection. For example, the control plane function entity 106 obtains a 4G charging parameter after the handover, and/or applies for a 4G online charging quota.

The state of the 5G handover trigger may be configured on the control plane function entity 106, or may be obtained by the control plane function entity 106 from another network entity such as a policy control entity 104, or may be updated and delivered by a charging function entity 122.

Step 514: After the handover from the 5G data connection to the 4G data connection, the control plane function entity 106 records network usage information of the 5G data connection and network usage information of the 4G data connection.

For example, the control plane function entity 106 records the usage information of a 4G online charging data flow and/or a 4G offline charging data flow in the 4G network with the usage information of a 5G online charging data flow and/or a 5G offline charging data flow in the 5G network. For a data flow on which online charging is performed, the control plane function entity 106 continues to use a quota requested for the 5G data connection for the terminal 114. The control plane function entity 106 disables a service usage counter of a QoS flow, buffers charging information of the QoS flow of the 5G data connection, and starts to collect charging information of a 4G bearer.

That the 5G handover trigger is in the inactive state may further be that the control plane function entity 106 determines that there is no active 5G handover trigger. For example, if the 5G handover trigger is disabled by the charging function entity 122, the 5G handover trigger is in the inactive state.

Step 516: The control plane function entity 106 determines whether a type of the 4G handover trigger is immediate reporting. If the type of the 4G handover trigger is immediate reporting, step 518 is performed; otherwise, step 522 is performed.

The determining that the 4G handover trigger does not need immediate reporting includes that the type of the 4G handover trigger is deferred reporting.

Step 518: The control plane function entity 106 sends a charging update message to the charging function entity 122. The charging update message is used to report network usage information of the PDU session connection of the terminal 114 in a 5G network access process.

The network usage information includes 5G data usage, 5G network use duration, and/or the like. The 5G data usage includes 5G online charging data flow usage and/or 5G offline charging data flow usage. The charging update message is sent through a 5G charging session.

Further, after the control plane function entity 106 determines that the type of the 5G handover trigger is immediate reporting, the control plane function entity 106 reports 5G network usage information of a rate group corresponding to the 5G handover trigger. The 4G charging trigger includes a 4G online charging trigger and/or a 4G offline charging trigger. The 5G handover trigger includes the 5G online handover trigger and/or the 5G offline handover trigger.

Step 520: The control plane function entity 106 receives a charging update response message sent by the charging function entity 122.

The charging update response message includes the update 4G charging trigger, a quota for 4G network access, and/or the like. The charging function entity 122 re-delivers the 4G charging trigger for the rate group corresponding to the 5G handover trigger. The control plane function entity 106 uses, in the 4G network, the 4G charging trigger redelivered by the charging function entity 122.

Step 522: The control plane function entity 106 stops the count the usage information of the 5G data connection in the 5G network, and re-records the usage information of the 4G data connection in the 4G network.

Specifically, the control plane function entity 106 disables the service usage counter and buffers the network usage information of the PDU session connection of the terminal 114 in the 5G network, and starts to record the network usage information of the quota in the 4G network by using a new service usage counter. For the data flow on which the online charging is performed, the control plane function entity 106 continues to use the quota requested for the 5G connection for the 4G data connection of the terminal 114.

Step 524: The control plane function entity 106 determines whether the 4G network supports the active 5G charging trigger for the 5G data connection. If the 4G network supports the activated 5G charging trigger for the 5G data connection, step 526 is performed; otherwise, step 528 is performed.

That the control plane function entity 106 determines whether to support the active 5G charging trigger for the 5G data connection includes: The control plane function entity 106 determines that the 4G charging trigger includes the 5G charging trigger; or the control plane function entity 106 determines whether the 4G charging trigger may be mapped to the 5G charging trigger. If the 4G charging trigger includes the 5G charging trigger, or the 4G charging trigger may be mapped to the 5G charging trigger, the 4G network supports, in the 5G data connection, the active 4G charging trigger.

The control plane function entity 106 may determine, based on a charging trigger mapping table shown in FIG. 4D, whether the active 5G charging trigger for the 5G data connection may be mapped to the 4G charging trigger. The charging trigger mapping table may be preconfigured in the control plane function entity 106, or may be obtained by the control plane function entity 106 from another network entity. For example, the control plane function entity 106 obtains the charging trigger mapping table from a policy control entity 106, or obtains the charging trigger mapping table from the charging function entity 122

Step 526: The control plane function entity 106 requests to perform charging by using the 5G charging trigger or the mapped 4G charging trigger.

If the 4G network includes the 5G charging trigger, the control plane function entity 106 continues to use, in the 4G data connection, the 5G charging trigger. If the control plane function entity 106 determines that the 4G charging trigger may be mapped to the 5G charging trigger, the control plane function entity 106 uses the mapped 4G charging trigger for the 4G data connection.

Step 528: The control plane function entity 106 ignores, in the 4G data connection, the 5G charging trigger.

If the control plane function entity determines that the 4G network does not include the 5G charging trigger, and the 4G charging trigger cannot be mapped to the 5G charging trigger, the control plane function entity 106 ignores, in the 4G data connection, the 5G charging trigger.

In another optional manner, during the handover from the 5G data connection to the 4G data connection, that is, when step 512 is being performed, the control plane function entity 106 further determines whether to support processing on a type of the 5G charging trigger for the 4G network. If the processing on the type of the 5G charging trigger is supported, the type of the 5G charging trigger remains unchanged. If the processing on the type of the 5G charging trigger is not supported, the control plane function entity 106 configures the type of the charging trigger as immediate reporting.

For example, the control plane function entity 106 determines that passes of an online charging data flow is not supported in the 4G network before a quota granted by the charging function entity 106 is obtained, and the control plane entity 106 passes the online charging data flow after receiving the quota granted by the charging function entity 122. For example, when the terminal 114 gains access to a 5G network, a PCC rule delivered or activated by a policy control entity 104 indicates that a non-blocking manner is used for some service data flows.

After the handover to the 4G data connection, if a PGW-C in the 4G network supports the non-blocking manner, the control plane function entity 106 processes, based on the non-blocking manner specified in the PCC rule, quota application and data flow passes. If the PGW-C in the 4G network does not support passing the data flow (namely, does not support the non-blocking manner) before obtaining the quota granted by the charging function entity, the control plane entity 106 passes the data flow after receiving the quota granted by the charging function entity 122. The non-blocking manner is passing the data flow when there is no quota.

It should be noted that, in the foregoing method, step 514, step 522, step 524, and step 518 are selectively performed based on the active state and the type of the 5G handover trigger, and do not indicate that the steps are performed in sequence.

In this embodiment, the control plane function entity 106 establishes, in the 5G network, the SBI charging session for the 5G data connection of the terminal 114, and performs charging on network usage of the 4G data connection after the handover. There is no need to re-establish a charging session for the 4G data connection of the terminal 114 after the terminal 114 is handed over to the 4G network, thereby simplifying a network handover and charging procedure. Further, in this embodiment, after the terminal 114 is handed over from the 5G data connection to the 4G data connection, targeted processing is performed on different charging parameters (for example, the quota, the trigger, and the charging parameter), so that in a process of the handover from the 5G data connection to the 4G data connection, charging continuity and accuracy can be ensured and user experience is improved.

The foregoing mainly describes the solutions provided in the embodiments of this application from a perspective of interaction between network elements. It may be understood that to implement the foregoing functions, the foregoing terminal, the AMF, and the control plane function entity include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the devices such as the terminal 114 and the control plane function entity 106 may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in this embodiment of this application, division into modules is an example, and is merely a logical function division. In actual implementation, another division manner may be used.

Figure 7:
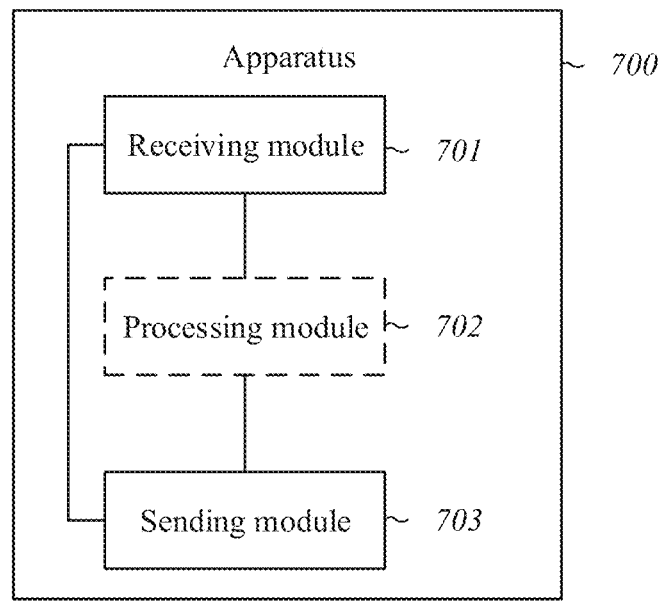
FIG. 7 is a schematic diagram of a structure of an apparatus according to an embodiment of this disclosure.

For example, when the function modules are obtained through division in an integrated manner, FIG. 7 is a schematic diagram of a structure of an apparatus 700. The apparatus 700 may be the charging function entity 122 in the foregoing embodiments, or may be a chip in the charging function entity 122. This is not specifically limited in this embodiment of this application. As shown in FIG. 7, the apparatus includes a receiving module 701, a processing module 702, and a sending module 703.

The receiving module 701 is configured to receive a charging service establishment message sent by a control plane function entity 106. The charging service establishment message is used to request to establish a charging session for a first network data connection. The sending module 703 is configured to send a charging session response message for the first network data connection to the control plane function entity 106. The receiving module 701 is further configured to receive, through the charging session, a charging session update message sent by the control plane function entity 106. The charging session update message carries an identifier of a second network data connection and network usage information of the first network data connection. The processing module 702 is configured to: after a terminal 114 is handed over from an accessed first network to a second network, charge, by using the charging session, the second network data connection established for the terminal 114.

Optionally, when the first network is a 4G network, and the second network is a 5G network, the receiving module 701 in the apparatus in FIG. 7 may be further configured to perform any receiving step performed by the charging function entity 122 in the method procedures in FIG. 3A, FIG. 3C and FIG. 4A to FIG. 4D. The processing module 702 in the apparatus in FIG. 7 may be further configured to perform processing steps performed by the charging function entity 122 in the method procedures in FIG. 3A, FIG. 3C, and FIG. 4A to FIG. 4D. The sending module 703 in the apparatus in FIG. 7 may be further configured to perform sending steps performed by the charging function entity 122 in the method procedures in FIG. 3A, FIG. 3C, and FIG. 4A to FIG. 4D.

Optionally, when the first network is a 5G network, and the second network is a 4G network, the receiving module 701 in the apparatus in FIG. 7 may be further configured to perform receiving steps performed by the charging function entity 122 in the method procedures in FIG. 3B, and FIG. 5A and FIG. 5B. The sending module 703 in the apparatus in FIG. 7 may be further configured to perform sending steps performed by the charging function entity 122 in the method procedures in FIG. 3B, and FIG. 5A and FIG. 5B. The processing module 702 in the apparatus in FIG. 7 may be further configured to perform processing steps performed by the charging function entity 122 in the method procedures in FIG. 3B, and FIG. 5A and FIG. 5B.

In another optional manner, the receiving module 701 in the apparatus 700 is configured to receive a charging service establishment message sent by a control plane function entity 106 through an SBI. The charging service establishment message sent through the SBI is used to request to establish, for a 4G data connection, an SBI charging session supporting performing online charging and offline charging in the 4G data connection. The sending module 703 in the apparatus 700 is configured to send a charging session response message for the 4G data connection to the control plane function entity 106. The charging session response message includes a 4G charging trigger for the 4G network.

Optionally, the receiving module 701 in the apparatus 700 is further configured to receive a charging session update message through the SBI charging session. The charging session update message carries an identifier of a 5G data connection after handover.

Optionally, the charging session update message carries usage of the 4G data connection in the 4G network and/or a quota request for the 5G data connection in the 5G network. The processing module 702 charges the usage of the 4G data connection in the 4G network based on the charging session update message; and/or the processing module 702 grants a pre-quota to the 5G data connection in the 5G network.

Figure 8A:
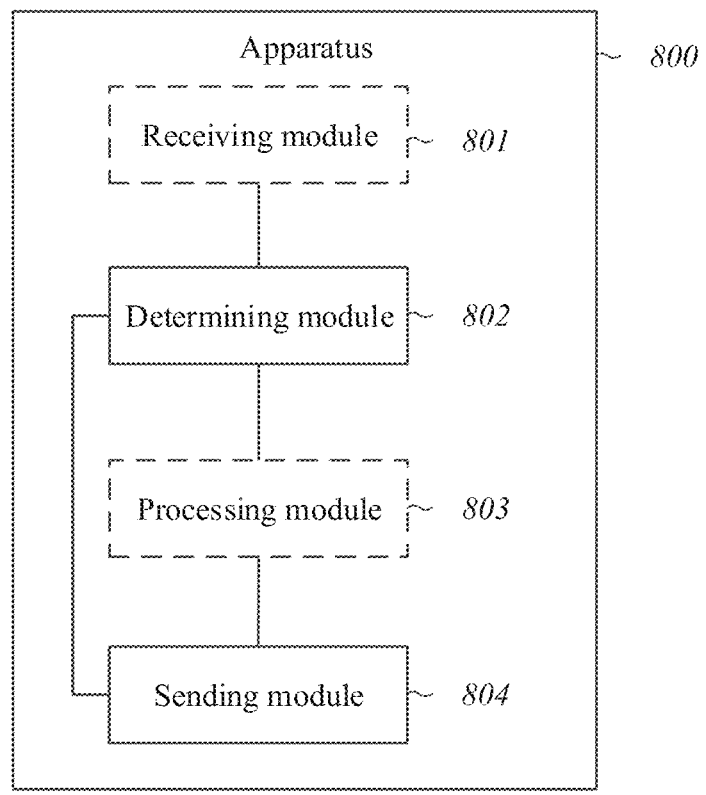
FIG. 8A is a schematic diagram of a structure of an apparatus according to an embodiment of this disclosure.

FIG. 8A is a schematic diagram of a structure of an apparatus 800. The apparatus 800 may be the control plane function entity 106 in the foregoing embodiments, or may be a chip in the control plane function entity 106. This is not specifically limited in this embodiment of this application. As shown in FIG. 8A, the apparatus includes a receiving module 801, a determining module 802, a processing module 803, and a sending module 804. The determining module 802 is configured to determine to request a charging function entity 122 to establish a service-based interface SBI charging session for a 4G data connection. The sending module 804 is configured to request, through the SBI charging session, to perform online charging and/or offline charging in the 4G data connection.

Optionally, the control plane function entity 106 includes a packet data network gateway control plane function. The determining module 802 is further configured to determine that the control plane function entity 106 further includes a session management function. The determining module 802 determines that a policy and charging control rule PCC rule includes indication of requesting the charging function entity to establish the SBI charging session, or includes: an address of a charging system designated for the 4G data connection is an address of the charging function entity 122 using the SBI. The determining module 802 determines that a previous charging session of the 4G data connection is the SBI charging session established with the charging function entity 122. Alternatively, the control plane function entity 106 determines to communicate with a policy function entity through the SBI message.

Optionally, the control plane function entity 106 includes a packet data network gateway control plane function. That the determining module 802 determines to request the charging function entity 122 to establish the SBI charging session includes: The determining module 802 determines that the control plane function entity 106 further includes a session management function, and determines that a terminal needs to support handover from a 4G network to a 5G network.

Optionally, the apparatus further includes the receiving module 801, configured to receive a request for establishing the 4G data connection. The determining module 802 is further configured to determine, based on a 5G system interworking indication parameter in the request for establishing the 4G data connection, that the terminal 114 supports gaining access to the 5G network and/or to allow the 4G data connection to interwork with the 5G network.

Optionally, the apparatus further includes the receiving module 801, configured to receive a request for establishing the 4G data connection. The apparatus includes a packet data network gateway control plane function. The determining module 802 is specifically configured to determine that the control plane function entity 106 further includes a session management function; and the determining module 802 determines, based on a 5G system interworking indication parameter in the request for establishing the 4G data connection, that the terminal 114 supports gaining access to the 5G network and/or to allow the 4G data connection to interwork with the 5G network.

Optionally, during handover from the 4G data connection to a 5G data connection, the determining module 802 is further configured to determine that a 4G handover trigger is in an active state and a type of the 4G handover trigger is an immediate reporting trigger. The sending module 804 is further configured to send a charging update message to the charging function entity through the SBI charging session. The charging update message includes network usage information of the 4G data connection and/or a quota request for the 5G data connection after the handover.

Optionally, during handover from the 4G data connection to a 5G data connection, the determining module 802 is further configured to determine that a 4G handover trigger is in an active state and that a type of the 4G handover trigger is a deferred reporting trigger. The processing module is 803 is configured to stop the count network usage information of the 4G data connection, and start a new count of network usage information of the 5G data connection after the handover.

Optionally, during handover from the 4G data connection to a 5G data connection, the determining module 802 is further configured to determine that there is no active 4G handover trigger after receiving a network handover request for the 4G data connection. The processing module 803 is configured to record network usage information of the 4G data connection and network usage information of the 5G data connection after the handover.

Optionally, the processing module 803 is configured to use, for the 5G data connection in the 5G network, a quota obtained for the 4G data connection.

Optionally, the processing module 803 is configured to process an activated 4G charging trigger for the 4G data connection.

Optionally, the determining module 802 is further configured to determine that the 5G network after handover does not support the activated 4G charging trigger for the 4G data connection, and the control plane function entity 106 ignores, in the 5G data connection after the handover, the 4G charging trigger.

Optionally, the determining module 802 is further configured to determine that the 5G network after handover supports the activated 4G charging trigger for the 4G data connection, and the control plane function entity 106 uses, in the 5G data connection after the handover, the 4G charging trigger.

Optionally, the processing module 803 is further configured to map the activated 4G charging trigger for the 4G data connection to a 5G charging trigger for the 5G network, and use the mapped 5G charging trigger for the 5G data connection after the handover.

In another optional manner, the modules in the apparatus in FIG. 8A may be further configured to perform steps performed by the control plane function entity 106 in the method procedures in FIG. 3A, FIG. 3C, and FIG. 4A to FIG. 4D.

Figure 8B:
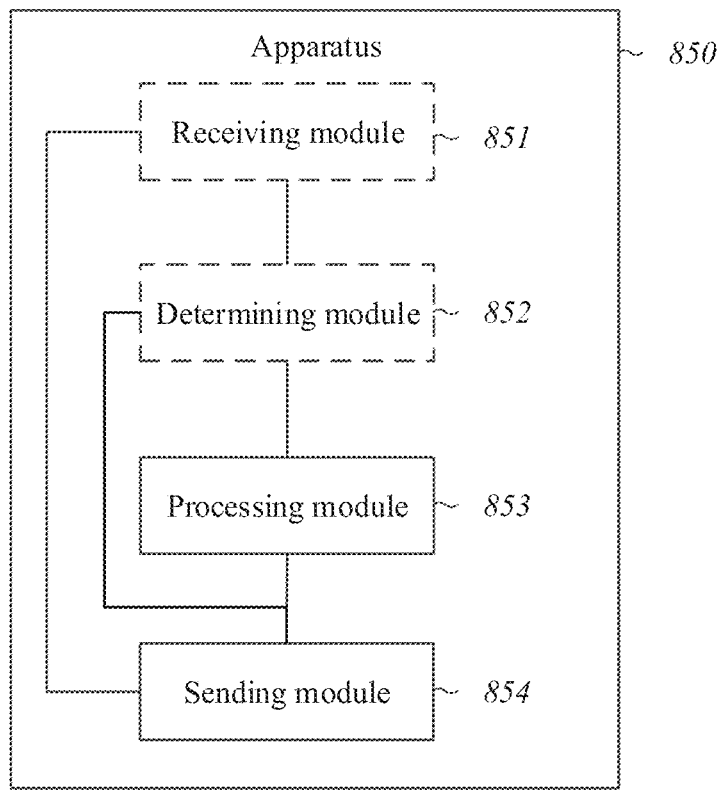
FIG. 8B is a schematic diagram of a structure of an apparatus according to an embodiment of this disclosure.

FIG. 8B is a schematic diagram of a structure of an apparatus 850. The apparatus 850 may be the control plane function entity 106 in the foregoing embodiments, or may be a chip in the control plane function entity 106. This is not specifically limited in this embodiment of this application. As shown in FIG. 8B, the apparatus includes a receiving module 851, a determining module 852, a processing module 853, and a sending module 854.

The sending module 854 is configured to send a charging service establishment message for a first network data connection to a charging function entity, to request to establish a charging session for the first network data connection. The processing module 853 is configured to request to perform, by using the charging session, online charging and/or offline charging on network usage information of the first network data connection. After handover from the first network data connection to a second network data connection, the processing module 853 is further configured to perform, by using the charging session, the online charging and/or the offline charging in the second network data connection established for a terminal 114.

Specifically, the receiving module 851 in the apparatus in FIG. 8B may be further configured to perform receiving steps performed by the control plane function entity 106 in the method procedures in FIG. 3A, FIG. 3B, FIG. 3C, and FIG. 5A and FIG. 5B. The determining module 852 in the apparatus in FIG. 8B may be further configured to perform determining steps performed by the control plane function entity 106 in the method procedures in FIG. 3B and FIG. 5A and FIG. 5B, for example, step 504, step 512, and/or step 520. The sending module 854 in the apparatus in FIG. 8B may be further configured to perform sending steps performed by the control plane function entity 106 in the method procedures in FIG. 3A, FIG. 3B, and FIG. 5A and FIG. 5B, for example, step 506, and/or step 514. The processing module 853 in the apparatus in FIG. 8B may be further configured to perform processing steps performed by the control plane function entity 106 in the method procedures in FIG. 3B, and FIG. 5A and FIG. 5B.

In another optional manner, the receiving module 851 is configured to receive a request for establishing the first network data connection for the terminal. The sending module sends a charging service establishment message to a charging function entity 122 to request to establish the charging session for the first network data connection. The processing module requests to perform the online charging and/or the offline charging in the first network data connection in the charging session, and is configured to: after the terminal 114 is handed over from the accessed first network to a second network, request to perform, by using the charging session, online charging and/or offline charging in the second network data connection established for the terminal 114.

Specifically, when the first network is a 5G network, and the second network is a 4G network, the receiving module 851 in the apparatus in FIG. 8B may be further configured to perform the receiving steps performed by the control plane function entity 106 in the method procedures in FIG. 3A, FIG. 3B, and FIG. 5A and FIG. 5B. The determining module 852 in the apparatus in FIG. 8B may be further configured to perform the determining steps performed by the control plane function entity 106 in the method procedures in FIG. 3A, FIG. 3B, and FIG. 5A and FIG. 5B, for example, step 512 and/or step 516. The sending module 854 in the apparatus in FIG. 8B may be further configured to perform sending steps performed by the control plane function entity 106 in the method procedures in FIG. 3A, FIG. 3B, and FIG. 5A and FIG. 5B. The processing module 853 in the apparatus in FIG. 8B may be further configured to perform the processing steps performed by the control plane function entity 106 in the method procedures in FIG. 3A, FIG. 3B, and FIG. 5A and FIG. 5B.

Specifically, when the first network is a 4G network, and the second network is a 5G network, the receiving module 851 in the apparatus in FIG. 8B may be further configured to perform the receiving steps performed by the control plane function entity 106 in the method procedures in FIG. 3A, FIG. 3B, and FIG. 4A to FIG. 4D. The determining module 852 in the apparatus in FIG. 8B may be further configured to perform the determining steps performed by the control plane function entity 106 in the method procedures in FIG. 3A, FIG. 3B, and FIG. 4A to FIG. 4C. The sending module 854 in the apparatus in FIG. 8B may be further configured to perform the sending steps performed by the control plane function entity 106 in the method procedures in FIG. 3A, FIG. 3B, and FIG. 4A to FIG. 4D. The processing module 853 in the apparatus in FIG. 8B may be further configured to perform the processing steps performed by the control plane function entity 106 in the method procedures in FIG. 3A, FIG. 3B, and FIG. 4A to FIG. 4C.

In this embodiment, the apparatus 800, 850 and/or 700 are presented in a form of function modules obtained through division in an integrated manner. The "module" herein may be an application-specific integrated circuit (application-specific integrated circuit, ASIC), a circuit, a processor and a memory for executing one or more software or firmware programs, an integrated logic circuit, and/or another device that can provide the foregoing function. In a simple embodiment, a person skilled in the art may figure out that the apparatus 800, 850 and/or 700 may use a form shown in FIG. 2.

For example, the processor 201 in FIG. 2 may invoke a computer execution instruction stored in the memory 203, so that the apparatus 800, and/or the apparatus 850 performs the session establishment method in the foregoing method embodiments.

Specifically, functions/implementation processes of the receiving module 801, the sending module 804, the determining module 802, and the processing module 803 in FIG. 8A, the receiving module 851, the sending module 854, the determining module 852, and the processing module 853 in FIG. 8B, and the receiving module 701, the processing module 702, and the sending module 703 in FIG. 7 may be implemented by the processor 201 in FIG. 2 by invoking the computer execution instruction stored in the memory 203.

Optionally, when the apparatus 800, 850 and/or 700 are chips, a function/implementation process of each module may be further implemented by using software, a circuit, or the like. Optionally, when the apparatus 800, 850 and/or 700 are chips, the memory 203 may be a storage unit in the chip, for example, a register or a cache. Certainly, this is not specifically limited in the embodiments of this application.

The apparatuses provided in the embodiments of this application may be configured to perform the foregoing charging method. Therefore, for technical effects that can be obtained by the apparatuses, refer to the foregoing method embodiments. Details are not described herein again.

The control plane function entity 800, 850, and/or 700 may be implemented on an integrated circuit, a radio frequency integrated circuit, a printed circuit board, and the like. In addition, the apparatus may be a self-supporting device, or may be a part of a larger device. In this embodiment, the control plane function entity 800, 850, and/or 700 are presented in a form of function modules obtained through division in an integrated manner. The "module" herein may be a specific ASIC, a circuit, a processor and a memory that execute one or more software or firmware programs, an integrated logic circuit, and/or another component that can provide the foregoing functions.

Figure 9:
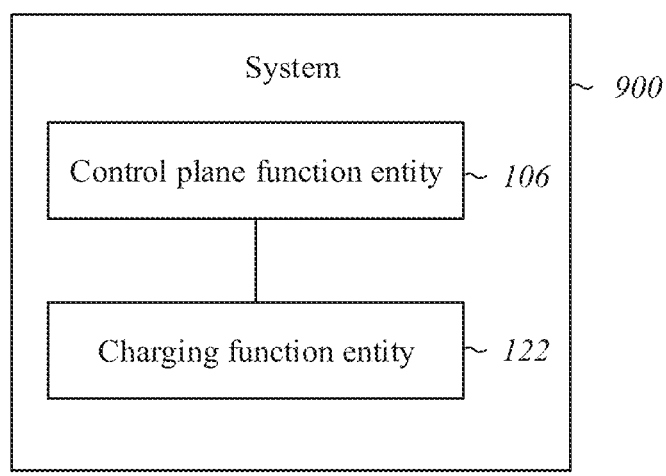
FIG. 9 is a schematic diagram of a system structure according to an embodiment of this disclosure.

FIG. 9 is a schematic diagram of a structure of a system 900. The apparatus system includes the charging function entity 122 in the foregoing embodiments and the control plane function entity 106 in the foregoing entities.

The charging function entity 122 may perform the foregoing embodiments and any step performed by the charging function entity 122 in FIG. 1 to FIG. 8B. The control plane function entity 106 may perform the foregoing embodiments and any step performed by the control plane function entity 106 in FIG. 1 to FIG. 8B. In this embodiment of the present disclosure, details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the scope of this application. Correspondingly, the specification and accompanying drawings are merely example description of this application defined by the appended claims, and is considered as any of or all modifications, variations, combinations or equivalents that cover the scope of this application. Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A charging method, comprising:
   determining, by a control plane function entity based on a 5G system interworking indication parameter in a request for establishing a 4th generation (4G) data connection, that a terminal supports an access to a 5G network or that the 4G data connection is allowed to interwork with the 5G network;
   determining, by the control plane function entity, to request a charging function entity to establish a service-based interface (SBI) charging session for the 4G data connection;
   sending, by the control plane function entity, a charging service establishment message to the charging function entity to establish the SBI charging session for the 4G data connection;
   receiving, by the control plane function entity, a charging session establishment response message that indicates that the SBI charging session for the 4G data connection is established; and
   performing, by the control plane function entity, online charging and/or offline charging in the 4G data connection through the SBI charging session.

2. The charging method according to claim 1, wherein during handover from the 4G data connection to a 5G data connection, the method further comprises:
   determining, by the control plane function entity, that a 4G handover trigger is in an active state, and that a type of the 4G handover trigger is an immediate reporting; and
   sending, by the control plane function entity, a charging update message to the charging function entity through the SBI charging session, wherein the charging update message comprises network usage information of the 4G data connection and/or a quota request for the 5G data connection after the handover.

3. The charging method according to claim 1, wherein during handover from the 4G data connection to a 5G data connection, the method further comprises:
   determining, by the control plane function entity, that a 4G handover trigger is in an active state, and that a type of the 4G handover trigger is a deferred reporting trigger;
   stopping, by the control plane function entity, a count of network usage information of the 4G data connection; and starting, by the control plane function entity, a new count of network usage information of the 5G data connection after the handover.

4. The charging method according to claim 3, further comprising: using, by the control plane function entity for the 5G data connection, a quota obtained for the 4G data connection; and
processing, by the control plane function entity, an activated 4G charging trigger for the 4G data connection.

5. The charging method according to claim 1, wherein during handover from the 4G data connection to a 5G data connection, the method further comprises:
determining, by the control plane function entity, that no active 4G handover trigger is present; and
counting, by the control plane function entity, network usage information of the 4G data connection and network usage information of the 5G data connection after the handover.

6. A apparatus, comprising:
at least one processor; and
a non-transitory computer-readable storage medium coupled to the at least one processor and storing one or more instructions that when executed by the at least one processor, cause the apparatus to perform operations comprising:
determining based on a 5G system interworking indication parameter in a request for establishing a 4th generation (4G) data connection, that a terminal supports an access to a 5G network or that the 4G data connection is allowed to interwork with the 5G network;
determining to request a charging function entity to establish a service-based interface (SBI) charging session for the data connection;
sending a charging service establishment message to the charging function entity to establish the SBI charging session for the 4G data connection;
receiving a charging session establishment response message that indicates that the SBI charging session for the 4G data connection is established; and
performing online charging and/or offline charging in the 4G data connection through the SBI charging session.

7. The apparatus according to claim 6, wherein during handover from the 4G data connection to a 5G data connection, the operation further comprises:
determining that a 4G handover trigger is in an active state, and that a type of the 4G handover trigger is an immediate reporting; and
sending a charging update message to the charging function entity through the SBI charging session, wherein the charging update message comprises network usage information of the 4G data connection and/or a quota request for the 5G data connection after the handover.

8. The apparatus according to claim 6, wherein during handover from the 4G data connection to a 5G data connection, the operation further comprises:
determining that a 4G handover trigger is in an active state, and that a type of the 4G handover trigger is a deferred reporting trigger;
stopping a count of network usage information of the 4G data connection; and
starting a new count of network usage information of the 5G data connection after the handover.

9. The apparatus according to claim 8, the operation further comprising:
using, for the 5G data connection, a quota obtained for the 4G data connection; and
processing an activated 4G charging trigger for the 4G data connection.

10. The apparatus according to claim 6, wherein during handover from the 4G data connection to a 5G data connection, the operation further comprises:
determining that no active 4G handover trigger is present; and
counting network usage information of the 4G data connection and network usage information of the 5G data connection after the handover.

11. A charging method, comprising:
determining, by a control plane function entity based on a 5G system interworking indication parameter in a request for establishing the 4G data connection, that a terminal supports an access to a 5G network or that the 4G data connection is allowed to interwork with the 5G network;
determining, by the control plane function entity, to request a charging function entity to establish a service-based interface (SBI) charging session for the 4G data connection;
sending, by the control plane function entity, a charging service establishment message to the charging function entity to establish the SBI charging session for the 4G data connection;
sending, by the charging function entity to the control plane function entity, a charging session establishment response message that indicates that the SBI charging session for the 4G data connection is established; and
performing, by the control plane function entity and the charging function entity, online charging and/or offline charging in the 4G data connection through the SBI charging session.

12. The charging method according to claim 11, wherein during handover from the 4G data connection to a 5G data connection, the method further comprises:
determining, by the control plane function entity, that a 4G handover trigger is in an active state, and that a type of the 4G handover trigger is an immediate reporting; and
sending, by the control plane function entity, a charging update message to the charging function entity through the SBI charging session, wherein the charging update message comprises network usage information of the 4G data connection and/or a quota request for the 5G data connection after the handover.

13. The charging method according to claim 11, wherein during handover from the 4G data connection to a 5G data connection, the method further comprises:
determining, by the control plane function entity, that a 4G handover trigger is in an active state, and that a type of the 4G handover trigger is a deferred reporting trigger;
stopping, by the control plane function entity, a count of network usage information of the 4G data connection; and
starting, by the control plane function entity, a new count of network usage information of the 5G data connection after the handover.

14. The charging method according to claim 13, further comprising:
using, by the control plane function entity for the 5G data connection, a quota obtained for the 4G data connection; and
processing, by the control plane function entity, an activated 4G charging trigger for the 4G data connection.

15. The charging method according to claim 11, wherein during handover from the 4G data connection to a 5G data connection, the method further comprises:
  determining, by the control plane function entity, that no active 4G handover trigger is present; and
  counting, by the control plane function entity, network usage information of the 4G data connection and network usage information of the 5G data connection after the handover.

16. A charging system, comprises:
  a control plane function entity; and
  a charging function entity, wherein:
  the control plane function entity is configured to:
    determine, based on a 5G system interworking indication parameter in a request for establishing the 4G data connection, that a terminal supports an access to a 5G network or that the 4G data connection is allowed to interwork with the 5G network;
    determine to request a charging function entity to establish a service-based interface (SBI) charging session for the 4G data connection;
    receive a charging session establishment response message that indicates that the SBI charging session for the 4G data connection is established; and
    perform online charging and/or offline charging in the 4G data connection through the SBI charging session; and
  the charging function entity is configured to:
    receive a charging service establishment message from the control plane function entity; and
    send a charging session establishment response message that indicates that the SBI charging session for the 4G data connection is established.

17. The charging system according to claim 16, wherein the control plane function entity is configured to:
  determine that a 4G handover trigger is in an active state, and that a type of the 4G handover trigger is an immediate reporting; and
  send a charging update message to the charging function entity through the SBI charging session, wherein the charging update message comprises network usage information of the 4G data connection and/or a quota request for the 5G data connection after the handover.

18. The charging system according to claim 16, wherein the control plane function entity is configured to:
  determine that a 4G handover trigger is in an active state, and that a type of the 4G handover trigger is a deferred reporting trigger;
  stop a count of network usage information of the 4G data connection; and
  start a new count of network usage information of the 5G data connection after the handover.

19. The charging system according to claim 16, wherein the control plane function entity is configured to:
  determine that no active 4G handover trigger is present; and
  count network usage information of the 4G data connection and network usage information of the 5G data connection after the handover.

20. The charging system according to claim 16, wherein the control plane function entity is configured to: use, for the 5G data connection, a quota obtained for the 4G data connection.

* * * * *